(12) United States Patent
Benakli et al.

(10) Patent No.: US 7,782,574 B1
(45) Date of Patent: Aug. 24, 2010

(54) MAGNETIC HEADS DISK DRIVES AND METHODS WITH THICKER READ SHIELD STRUCTURES FOR REDUCED STRAY FIELD SENSITIVITY

(75) Inventors: Mourad Benakli, Shrewsbury, MA (US); Michael Mallary, Sterling, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1175 days.

(21) Appl. No.: 11/399,196

(22) Filed: Apr. 6, 2006

Related U.S. Application Data

(60) Provisional application No. 60/669,990, filed on Apr. 11, 2005.

(51) Int. Cl.
*G11B 5/39* (2006.01)
(52) U.S. Cl. .................................................. 360/317
(58) Field of Classification Search ................ 360/317, 360/319, 324, 327.23, 327.31
See application file for complete search history.

(56) References Cited

U.S. PATENT DOCUMENTS

| | | | | |
|---|---|---|---|---|
| 5,621,592 A | * | 4/1997 | Gill et al. | 360/319 |
| 5,838,521 A | * | 11/1998 | Ravipati | 360/319 |
| 6,275,360 B1 | * | 8/2001 | Nakamoto et al. | 360/319 |
| 6,512,661 B1 | | 1/2003 | Louis | |
| 6,563,677 B2 | * | 5/2003 | Narumi et al. | 360/319 |
| 6,677,061 B2 | | 1/2004 | Shimizu et al. | |
| 6,760,191 B1 | | 7/2004 | Yan | |
| 6,775,108 B2 | * | 8/2004 | Kief et al. | 360/319 |
| 6,824,625 B2 | * | 11/2004 | Fukuda et al. | 148/311 |
| 6,842,313 B1 | | 1/2005 | Mallary | |
| 6,894,878 B1 | | 5/2005 | Cross | |
| 6,950,277 B1 | | 9/2005 | Nguy et al. | |
| 6,972,919 B2 | | 12/2005 | Suk | |
| 6,995,950 B2 | | 2/2006 | Lairson et al. | |
| 7,154,713 B2 | * | 12/2006 | Watanabe et al. | 360/313 |
| 7,180,712 B1 | * | 2/2007 | Li et al. | 360/319 |
| 7,606,006 B2 | * | 10/2009 | Mochizuki et al. | 360/319 |
| 2003/0043513 A1 | * | 3/2003 | Lin | 360/317 |
| 2006/0002020 A1 | * | 1/2006 | Pokhil et al. | 360/126 |
| 2006/0092575 A1 | * | 5/2006 | Mochizuki et al. | 360/317 |

* cited by examiner

*Primary Examiner*—Angel A. Castro
(74) *Attorney, Agent, or Firm*—Kinney & Lange, P.A.

(57) ABSTRACT

A head of a disk drive comprises a read element, a top read shield, a bottom read shield, a stray field shield, and an exchange decoupling layer. The read element allows for reading magnetic fields from a recording medium. The top read shield, the bottom read shield, and the stray field shield allow for at least partially shielding the read element from stray magnetic fields. The exchange decoupling layer allows for at least partially providing exchange decoupling of the stray field shield and the bottom read shield. The read element is located at least partially between the top read shield and the bottom read shield. The bottom read shield is located at least partially between the stray field shield and the top read shield, and the exchange decoupling layer is located at least partially between the stray field shield and the bottom read shield.

45 Claims, 17 Drawing Sheets

Field in Recording Media Corresponding to Positions on ABS of Read Structure

Erase Field vs. Bottom Read Shield Structure Thickness

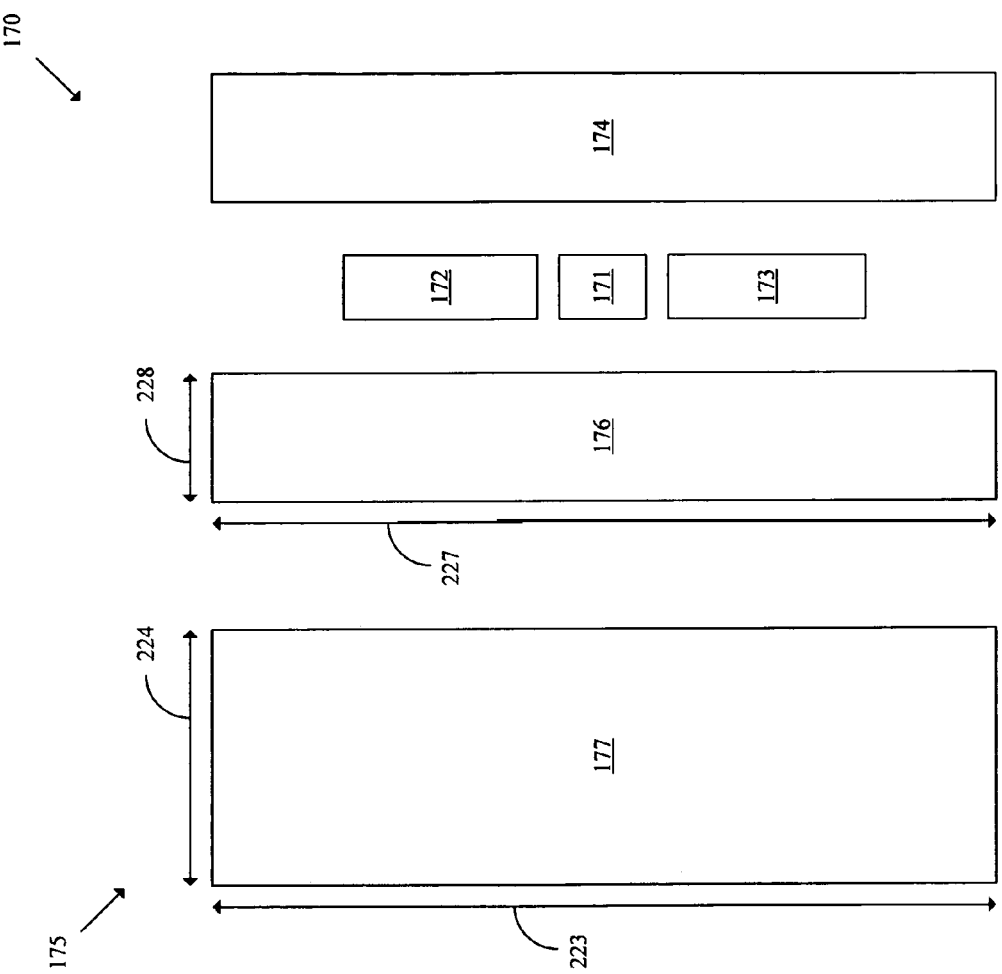

Asymmetry Field Near Read Element vs. Stray Field Shield Height For Different Recesses of Stray Field Shield From ABS

MAGNETIC HEADS DISK DRIVES AND METHODS WITH THICKER READ SHIELD STRUCTURES FOR REDUCED STRAY FIELD SENSITIVITY

CROSS-REFERENCE TO RELATED PATENT APPLICATIONS

Embodiments of the present invention relate to U.S. Provisional Application Ser. No. 60/669,990, filed Apr. 11, 2005, entitled "S0 Structure for Reduced Stray Field Sensitivity", the contents of which are incorporated by reference herein and which is a basis for a claim of priority.

BACKGROUND OF THE INVENTION

1. Field of the Invention

Embodiments of the present invention relate generally to magnetic heads, disk drives, and methods and, in specific embodiments, to a head comprising a read element, a top read shield, a bottom read shield, a stray field shield, and an exchange decoupling layer, where the top read shield, the bottom read shield, and the stray field shield allow for at least partially shielding the read element from stray magnetic fields, and the exchange decoupling layer allows for at least partially providing exchange decoupling of the stray field shield and the bottom read shield.

2. Related Art

A major goal among many disk drive manufacturers is to continue to increase an amount of data that can be stored on a recording medium while still maintaining data integrity and disk drive reliability. In recent years, disk drive manufacturers have started to look to perpendicular recording as a way of increasing a number of data bits per square inch on a recording medium by storing magnetization vertically within the recording medium, rather than simply storing magnetization longitudinally in the recording medium as in longitudinal recording. However, experiments have shown that perpendicular disk drives are more sensitive to external stray magnetic fields than are longitudinal disk drives, and such external stray magnetic fields may lead to a loss of performance and even to irreversible disk drive failure in perpendicular disk drives.

Perpendicular disk drives typically comprise a head and a recording medium. The head typically comprises a read structure and a write structure, where the read structure typically comprises a read element for reading data from the recording medium and two read shields for at least partially shielding the read element from stray magnetic fields. It is generally desirable to have the read element react only to magnetic fields provided from a portion of the recording medium that is directly under the read element, so the read element may be placed between the two read shields, where the read shields are intended to block magnetic fields provided from neighboring portions of the recording medium.

Examples of perpendicular disk drives are provided in the following references: (i) U.S. Pat. No. 6,842,313 entitled "Floating Down Stream Perpendicular Write Head Shield", the contents of which are incorporated by reference herein; (ii) U.S. Pat. No. 6,950,277 entitled "Concave Trailing Edge Write Pole for Perpendicular Recording", the contents of which are incorporated by reference herein; and (iii) U.S. Pat. No. 6,760,191 entitled "Internal Heat Dissipater used to Reduce Slider and Write Pole Thermal Protrusion for Thin Film Recording Heads", the contents of which are incorporated by reference herein.

Experiments have demonstrated that perpendicular disk drives are sensitive to external stray magnetic fields that are generated by sources external to the disk drives. External stray magnetic fields may be generated by many external sources including, but not limited to, motors, magnets, electric currents, and the like. For example, external stray magnetic fields entering a particular disk drive may be caused by drive motors of adjacent disk drives that are in a same enclosure with the particular disk drive. Also, with disk drives placed in televisions, automobiles, computers, and the like, there are many potential sources of external stray magnetic fields, such as power supplies, motors, electric circuits, and the like.

In various experiments, a loss or performance has been observed in perpendicular disk drives when they are operated in the presence of external stray magnetic fields. Such a loss of performance was noticed even for relatively small external stray magnetic fields. For example, in various experiments, one order of bit error rate (BER) loss was observed in perpendicular disk drives when the disk drives were in the presence of external stray magnetic fields with strengths even as small as 10 Oersted (Oe). A possible explanation of the BER loss is an increase in asymmetry of a read element due to a resulting stray magnetic field in a vicinity of the read element.

Also, in various experiments, an irreversible disk drive failure has been observed if a perpendicular disk drive is operated in the presence of a large enough external stray magnetic field. For example, irreversible disk drive failures have been observed in perpendicular disk drives that are operated in the presence of external stray magnetic fields with strengths even as small as approximately 50 Oe. The irreversible failures of the disk drives have been associated with an erasure of servo data on recording media in the disk drives. Servo data on a recording medium permits the determination of the position of a head with respect to the recording medium, and if the servo data is erased, the head is not able to be positioned properly for read and write operations, which leads to an irreversible drive failure.

Based on the experiments that show a loss of performance and even a possible irreversible disk drive failure for relatively small external stray magnetic fields, it is important to try to determine a possible explanation for the increase in asymmetry of a read element and an erasure of data on a recording medium due to such relatively small external stray magnetic fields. It has been noted in U.S. Pat. No. 6,995,950 entitled "Transverse Biased Shields for Perpendicular Recording to Reduce Stray Field Sensitivity", the contents of which are incorporated by reference herein, that read shields capture stray magnetic fields. In an analysis performed by the first named inventor of the present patent application as filed, the read shields have been found to provide a large magnetic field when in the presence of an external stray magnetic field, which can explain the increase in asymmetry of a read element and the erasure of a recording medium.

Traditional read shields are manufactured with thicknesses that are designed to provide good domain structures such that the creation of bad magnetic domains in the read shields can be hopefully avoided. However, the first named inventor of the present patent application as filed has determined that the geometries of traditional read shields cause the read shields to capture, focus, and greatly magnify external stray magnetic fields, which can lead to strong magnetic fields near a read element and a recording medium in a disk drive to possibly result in a loss of performance in the disk drive and an irreversible drive failure in the disk drive.

In light of the above-mentioned problems, there is a need for read shields of heads of disk drives that provide for less magnification of external stray magnetic fields than with traditional read shields. Also, there is a need for reducing a sensitivity of disk drives to external stray magnetic fields without greatly increasing a number of manufacturing steps or a manufacturing cost.

SUMMARY OF THE DISCLOSURE

Embodiments of the present invention relate to magnetic heads, disk drives, and methods with read shield structures having thicknesses that are set for reducing a sensitivity of disk drives to external stray magnetic fields. Such heads, disk drives, and methods may help in reducing an erasure of recording media due to external stray magnetic fields and may help in reducing an asymmetry of read elements due to external stray magnetic fields.

A head in accordance with an embodiment of the present invention comprises a read element, a top read shield, a bottom read shield, a stray field shield, and an exchange decoupling layer. The read element allows for reading magnetic fields from a recording medium. The top read shield, the bottom read shield, and the stray field shield allow for at least partially shielding the read element from stray magnetic fields. The exchange decoupling layer allows for at least partially providing exchange decoupling of the stray field shield and the bottom read shield. The read element is located at least partially between the top read shield and the bottom read shield. The bottom read shield is located at least partially between the stray field shield and the top read shield, and the exchange decoupling layer is located at least partially between the stray field shield and the bottom read shield.

In various embodiments, the read element comprises a magnetoresistive read element. In further embodiments, the read element comprises at least one of an anisotropic magnetoresistive read element, a giant magnetoresistive read element, and a tunneling magnetoresistive read element. In some embodiments, the top read shield comprises a magnetic material having an orientation selected to capture at least a portion of the stray magnetic fields. Also, in some embodiments, the bottom read shield comprises a magnetic material having an orientation selected to capture at least a portion of the stray magnetic fields. In further embodiments, the bottom read shield comprises a ferromagnetic material, or the like. In some embodiments, the stray field shield comprises a magnetic material having an orientation selected to capture at least a portion of the stray magnetic fields. Also, in further embodiments, the stray field shield comprises a NiFe invar like alloy or the like, where the Ni composition is between 30 and 45 atomic percent.

In various embodiments, the bottom read shield comprises a first magnetic material, and the stray field shield comprises a second magnetic material that is a different type of material than the first magnetic material. In some embodiments, the second magnetic material has a lower coefficient of thermal expansion than the first magnetic material. In some embodiments, a height of the stray field shield is approximately a same height as a particular height of the bottom read shield. In various embodiments, a height of the stray field shield is less than a particular height of the bottom read shield. Also, in various embodiments, a height of the top read shield is approximately a same height as a particular height of the bottom read shield.

In some embodiments, a thickness of the stray field shield is thicker than a particular thickness of the bottom read shield. In further embodiments, a thickness of the top read shield is approximately a same thickness as a particular thickness of the bottom read shield. In various embodiments, a width of the stray field shield is wider than a particular width of the bottom read shield. Also, in various embodiments, a height of the bottom read shield is greater than a particular height of the read element.

In some embodiments, the exchange decoupling layer comprises a non-magnetic material. In various embodiments, the stray field shield comprises a material, the exchange decoupling layer comprises a particular material, and the particular material of the exchange decoupling layer is more malleable than the material of the stray field shield. Also, in various embodiments, the exchange decoupling layer comprises at least one of copper, chromium, gold, silver, platinum, iridium, tantalum, titanium, tungsten, or the like. In some embodiments, the exchange decoupling layer has a thickness that is thick enough such that a domain structure of the bottom read shield is unaffected by the stray field shield. Also, in some embodiments, the exchange decoupling layer has a thickness that is greater than 20 nm.

In various embodiments, a ratio of a thickness of the stray field shield plus a particular thickness of the bottom read shield to a height of the bottom read shield is greater than 0.2. In some embodiments, the read element is located entirely between the bottom read shield and the top read shield. Also, in some embodiments, the exchange decoupling layer is located entirely between the stray field shield and the bottom read shield. In various embodiments, at least one edge of the stray field shield is tapered. Also, in various embodiments, the stray field shield is recessed from an air bearing surface of the head. In some embodiments, the head further comprises a write structure for writing data to the recording medium, and the top read shield is located at least partially between the read element and the write structure.

A disk drive in accordance with an embodiment of the present invention comprises a recording medium and a head. The recording medium allows for storing data as magnetic fields. The head comprises a read element, a top read shield, a bottom read shield, a stray field shield, and an exchange decoupling layer. The read element allows for reading magnetic fields from the recording medium. The top read shield, the bottom read shield, and the stray field shield allow for at least partially shielding the read element from stray magnetic fields. The exchange decoupling layer allows for at least partially providing exchange decoupling of the stray field shield and the bottom read shield. The read element is located at least partially between the top read shield and the bottom read shield. The bottom read shield is located at least partially between the stray field shield and the top read shield, and the exchange decoupling layer is located at least partially between the stray field shield and the bottom read shield.

A method of manufacturing a head in accordance with an embodiment of the present invention comprises: (a) providing a substrate; (b) depositing an undercoating on at least a portion of the substrate; (c) depositing a stray field shield on at least a portion of the undercoating, the stray field shield comprising a magnetic material; (d) depositing an exchange decoupling layer on at least a portion of the stray field shield; (e) depositing a bottom read shield on at least a portion of the exchange decoupling layer, the bottom read shield comprising a particular magnetic material; (f) depositing an insulating layer on at least a portion of the bottom read shield; and (g) depositing a read element on at least a portion of the insulating layer; wherein (i) the read element is capable of reading magnetic fields from a recording medium; (ii) the stray field shield is capable of at least partially shielding the read element from stray magnetic fields; and (iii) the bottom read shield is capable of at least partially shielding the read element from the stray magnetic fields.

In various embodiments, the method of manufacturing the head further comprises depositing a photoresist layer on the undercoating and patterning the photoresist layer to form a cavity. In further embodiments, the step of depositing the stray field shield, comprises plating the stray field shield on at least a portion of a plating seed layer and the undercoating and within a first portion of the cavity. In still further embodiments, the step of depositing the exchange decoupling layer, comprises plating the exchange decoupling layer on at least a portion of the stray field shield and within a second portion of the cavity. In yet further embodiments, the step of depositing the bottom read shield, comprises plating the bottom read shield on at least a portion of the exchange decoupling layer and within a third portion of the cavity.

A method in accordance with an embodiment of the present invention, comprises: (a) creating, on a computer, a computer model of a head/media structure comprising a recording medium and a head, the head having a bottom read shield structure with an initial thickness and a predetermined height; (b) performing, by the computer, finite element analysis with the computer model of the head/media structure using a finite element method to simulate a particular magnetic field generated in at least a portion of the recording medium located under the head in the computer model when the head is subjected to an external stray magnetic field of a predetermined strength; (c) determining a particular strength of the particular magnetic field simulated in the finite element analysis; (d) determining whether or not the particular strength of the particular magnetic field is less than a predetermined threshold value; (e) increasing the thickness of the bottom read shield structure in the computer model of the head/media structure by a predetermined amount if it is determined that the particular strength is not less than the predetermined threshold value; and (f) repeating steps b) through e) until it is determined in step d) that the particular strength is less than the predetermined threshold value.

In various embodiments, the method further comprises displaying, on the computer, the thickness of the bottom read shield structure in the computer model if it is determined in step d) that the particular strength is less than the predetermined threshold value. Also, in various embodiments, the method further comprises manufacturing a specific head having a specific bottom read shield structure with a specific thickness that is a same thickness as the thickness of the bottom read shield structure in the computer model if it is determined in step d) that the particular strength is less than the predetermined threshold value.

BRIEF DESCRIPTION OF THE DRAWINGS

FIG. 8B illustrates an air bearing surface view of a read structure in accordance with an embodiment of the present invention;

DETAILED DESCRIPTION OF PREFERRED EMBODIMENTS

Reference will now be made to the accompanying drawings, which assist in illustrating various pertinent features of embodiments of the present invention. Although embodiments of the present invention will now be described primarily in conjunction with disk drives, it should be expressly understood that embodiments of the present invention may be applicable to other applications where magnetic recording of data is required or desired. In this regard, the following description of a disk drive is presented for purposes of illustration and description. Also, embodiments of the present invention are described in terms of perpendicular recording systems, but the teachings of embodiments of the present invention are readily extended to other systems such as longitudinal recording systems and the like.

Figure 1:
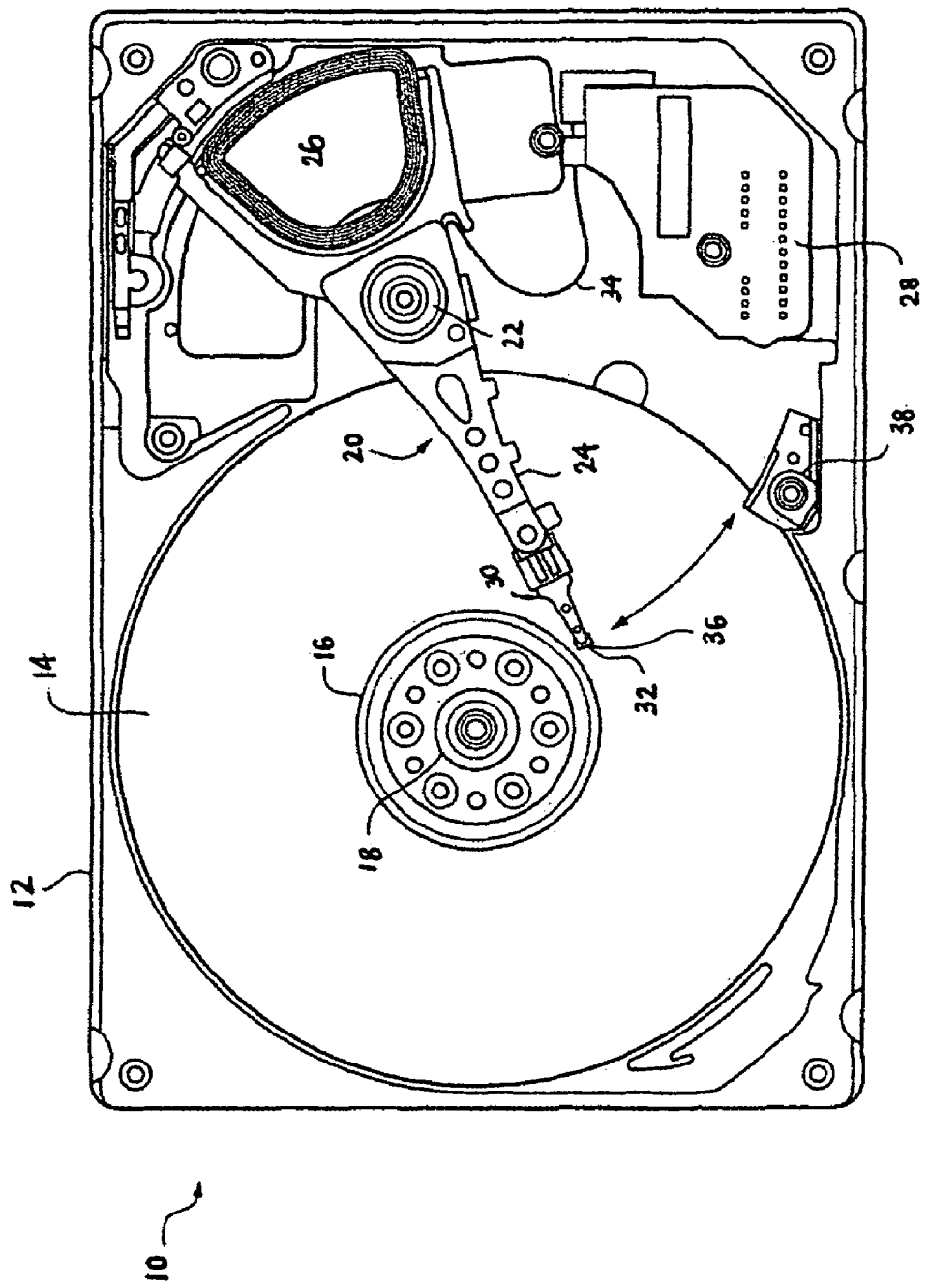
FIG. 1 illustrates a disk drive in accordance with an embodiment of the present invention.

FIG. 1 illustrates a disk drive 10 in accordance with an embodiment of the present invention. The disk drive 10 generally includes a base plate 12 and a cover (not shown) that may be disposed on the base plate 12 to define an enclosed housing or space for various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips, or the like, that cantilever from a common structure. In any case, movement of the actuator arm assembly 20 is provided by an actuator arm drive assembly, such as a voice coil motor 26, or the like. The voice coil motor 26 may be a magnetic assembly that controls the operation of the actuator arm assembly 20 under a direction of control electronics 28.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. The biasing forces exerted by the suspension 30 on its corresponding slider 32 thereby attempt to move the slider 32 in the direction of its corresponding disk 14. Typically, this biasing force is such that if the slider 32 were positioned over the corresponding disk 14 without the disk 14 being rotated at a sufficient velocity, the slider 32 would be in contact with the disk 14. The disk drive 10 includes a transducer or head 36 attached to the slider 32 for reading data from and/or writing data to a surface of the disk 14.

The head 36 on the slider 32 is interconnected with the control electronics 28 of the disk drive 10 by a flex cable 34 that is typically mounted on the actuator arm assembly 20. Signals may be exchanged between the head 36 and its corresponding data storage disk 14 for disk drive read/write operations. In this regard, the voice coil motor 26 is utilized to pivot the actuator arm assembly 20 to simultaneously move the slider 32 along a path and across the corresponding data storage disk 14 to position the head at a desired or required radial position on the disk 14 (i.e., at an approximate location of a desired track on the data storage disk 14) for disk drive read/write operations.

When the disk drive 10 is not in operation, the actuator arm assembly 20 may be pivoted to a parked position to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired parking function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or landing on the corresponding data storage disk 14, and the slider 32 would remain on the disk 14 until disk drive operations were re-initiated.

The slider 32 of the disk drive 10 may be configured to "fly" on an air bearing during rotation of its corresponding data storage disk 14 at a sufficient velocity. The slider 32 may be disposed at a pitch angle such that its leading edge is disposed further from its corresponding data storage disk 14 than its trailing edge. The head 36 would typically be incorporated on the slider 32 generally toward its trailing edge since this edge may be positioned closest to its corresponding disk 14. Other pitch angles and orientations could also be utilized for flying the slider 32.

Figure 2A:
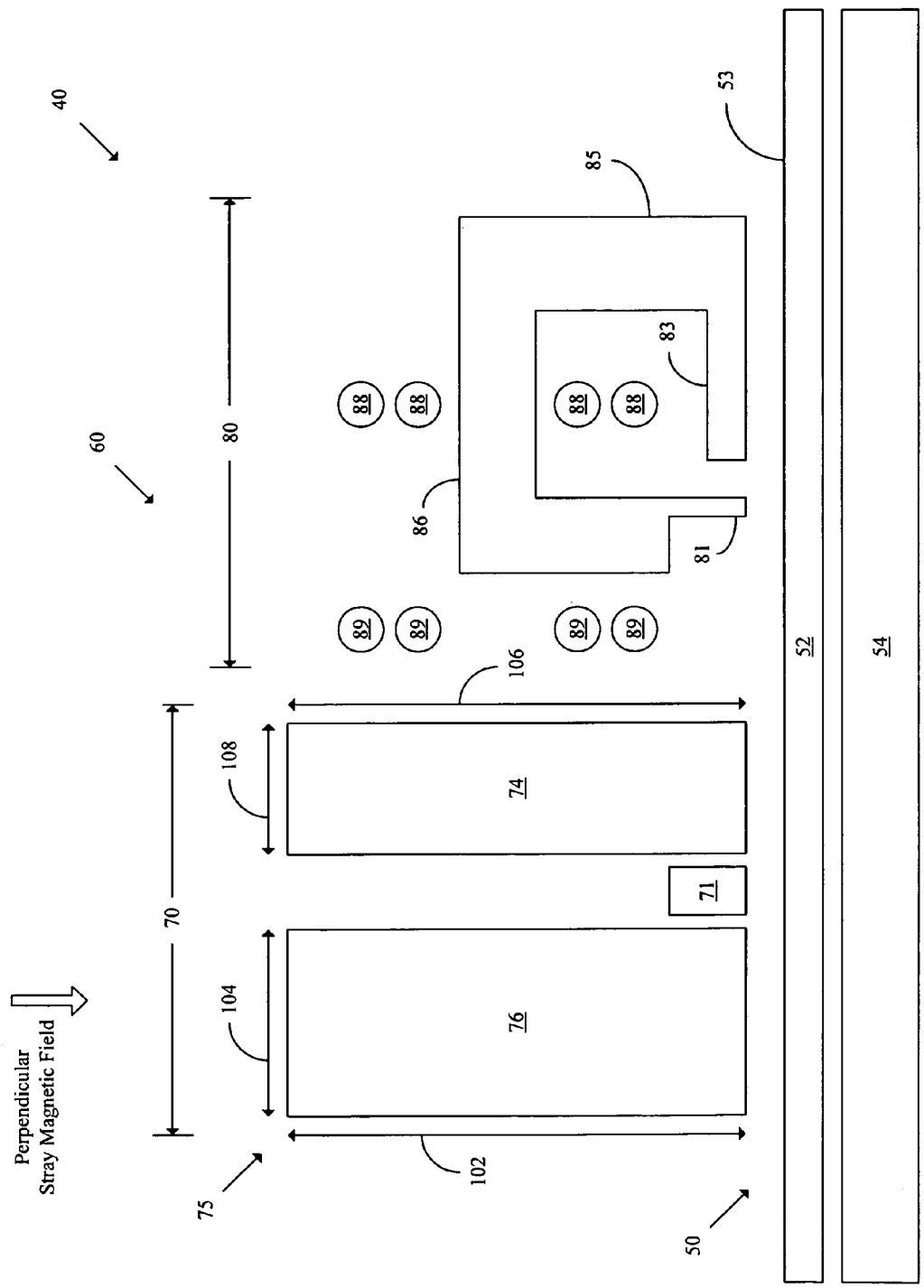
FIG. 2A illustrates a side view of a head/media structure in accordance with an embodiment of the present invention.

FIG. 2A illustrates a side view of a head/media structure 40 in accordance with an embodiment of the present invention. The head/media structure 40 comprises a recording medium 50 and a head 60. In various embodiments, the head/media structure 40 may be part of a disk drive, in which case the disk drive may further include similar components as components of the disk drive 10, where the recording medium 50 would correspond to the disk 14, and the head 60 would correspond to the head 36.

The recording medium 50 allows for storing data as magnetic fields and comprises a recording layer 52 and a soft underlayer (SUL) 54. In various embodiments, the recording layer 52 comprises a magnetic material with a plurality of grains (not shown) that are oriented perpendicular to the medium, where a magnetization of each grain of the plurality of grains may point either "up" or "down". In various embodiments, the SUL 54 comprises a particular magnetic material that is softer than the magnetic material of the recording layer 52.

In some embodiments, the recording layer 52 comprises a magnetically hard material with a strong perpendicular magnetic anisotropy, a relatively high coercivity compared to the SUL 54, and a relatively low permeability compared to the SUL 54. Also, in some embodiments, the SUL 54 comprises a magnetically soft material with a lower coercivity than the recording layer 52 and a higher permeability than the recording layer 52. The recording layer 52 may be separated from the SUL 54 by a non-magnetic spacer layer (not shown). During writing operations, a magnetic flux from a write pole 81 may pass vertically through the recording layer 52 to the SUL 54, so as to allow for perpendicular recording by magnetizing one or more of the plurality of grains of the recording layer 52, and then the magnetic flux may return to a write shield 83 and to a write return yoke 85 from the SUL 54.

In various embodiments, the head 60 comprises a read structure 70 and a write structure 80. In various other embodiments, it is possible for the head 60 to comprise only the read structure 70 without the write structure 80. The read structure 70 comprises a read element 71, a top read shield 74, and a bottom read shield structure 75. The bottom read shield structure 75 comprises a bottom read shield 76. The write structure 80 comprises the write pole 81, the write shield 83, the write return yoke 85, a write yoke 86, one or more write coils 88, and one or more bucking coils 89. In various embodiments, such as the embodiment illustrated in FIG. 2A, the write return yoke 85 is separate from the top read shield 74. However, in various other embodiments, the top read shield 74 of the read structure 70 may also be used as the write return yoke 85 of the write structure 80.

During writing operations, a current is passed through the one or more write coils 88, which surround a portion of the write yoke 86. As a consequence, a magnetic flux is produced in the write yoke 86 and is focused at the write pole 81, where the magnetic flux passes from the write pole 81 to the recording medium 50 in order to write data to the recording medium 50. The magnetic flux from the write pole 81 that is passed to the recording medium 50 returns from the recording medium 50 to the write shield 83 and to the write return yoke 85 and then from the write return yoke 85 back to the write yoke 86.

A direction of current through the one or more write coils 88 varies depending on a direction of magnetization to be produced in the recording layer 52 for a given bit. When a current is passed through the one or more write coils 88, a current is passed through the one or more bucking coils 89 in an opposite direction from a direction of current in the one or more write coils 88, so as to help prevent a magnetic field from being generated in the read structure 70 due to the current in the one or more write coils 88 and, thus, to aid in decoupling the read structure 70 from the write structure 80. When no data is being written to the recording medium 50, a current purposely applied to the one or more write coils 88 for writing data may be stopped, such that ideally no current would flow through the one or more write coils 88 when not performing write operations.

The read element 71 allows for reading data from the recording medium 50 based on magnetic fields provided from the recording medium 50. The read element 71 may utilize various types of read sensor technologies, such as anisotropic magnetoresistive (AMR), giant magnetoresistive (GMR), tunneling magnetoresistive (TuMR), or the like. The term "magnetoresistive sensor" is used in the present application to encompass all those types of magnetoresistive sensor technologies and any others in which a variation in a resistance of a sensor due to an application of an external magnetic field is detected.

In various embodiments, the read element 71 comprises an AMR read element, where the AMR read element allows for reading data from the recording medium 50 by detecting a change in a magnetic field from the recording medium 50. In other embodiments, the read element 71 comprises a GMR read element, where the GMR read element allows for reading data from the recording medium 50 by directly detecting a magnetic field from the recording medium 50. GMR read elements are typically more sensitive to small magnetic fields than are AMR read elements and, as a result, it may be preferable to use a GMR read element in a perpendicular recording system to improve reading of data. In still other embodiments, the read element 71 comprises a TuMR read element. TuMR read elements are similar to GMR read elements, but various TuMR read elements may rely on spin dependent tunneling currents across an isolation layer, while various GMR read elements may rely on spin dependent scattering mechanisms between two or more magnetic layers.

The top read shield 74 and the bottom read shield 76 each comprise a magnetic material. In various embodiments, the top read shield 74 and the bottom read shield 76 each comprise a magnetically soft material, such as a nickel-iron alloy, or the like. Also, in various embodiments, the top read shield 74 and the bottom read shield 76 have a high permeability to perpendicular magnetic fields, so as to capture stray magnetic fields from the recording medium 50. The read element 71 is located at least partially between the top read shield 74 and the bottom read shield 76. In various embodiments, the read element 71 is located entirely between the top read shield 74 and the bottom read shield 76.

The bottom read shield 76 has a bottom read shield height 102, and has a bottom read shield thickness 104. In the embodiment of FIG. 2A, the bottom read shield structure 75 only comprises the bottom read shield 76, so a height of the bottom read shield structure 75 is the same as the bottom read shield height 102, and a thickness of the bottom read shield structure 75 is the same as the bottom read shield thickness 104. The top read shield 74 has a top read shield height 106, and has a top read shield thickness 108.

Figure 2B:
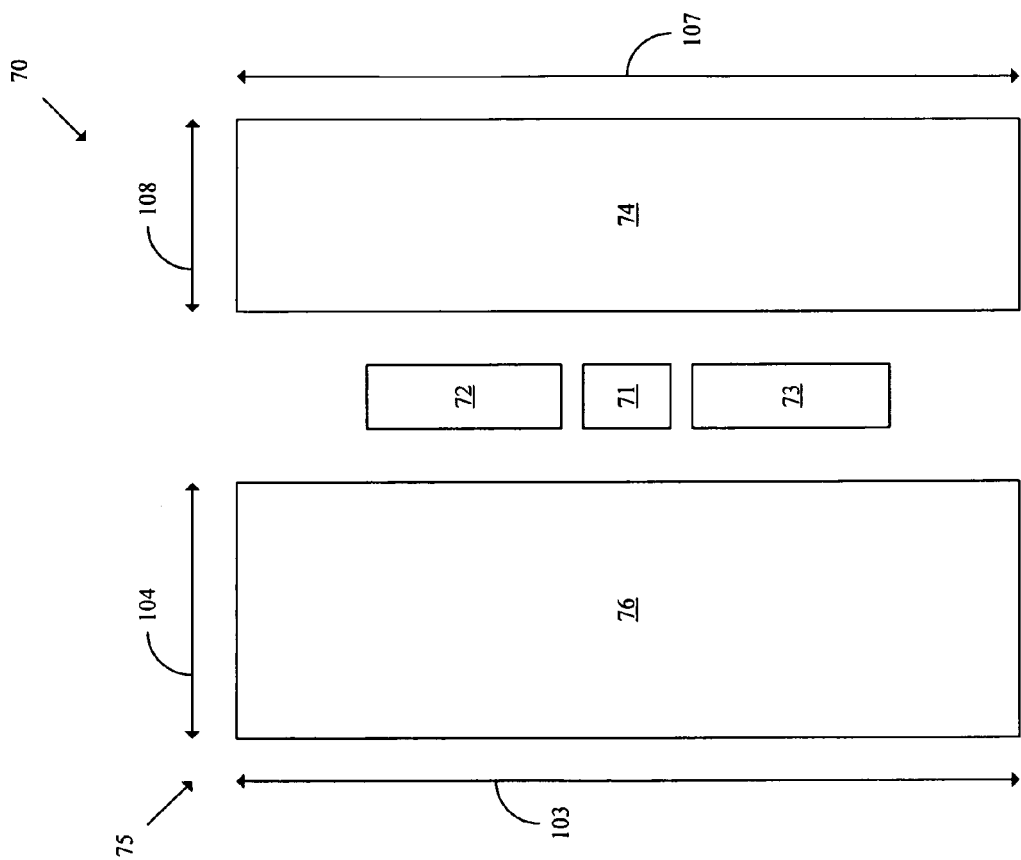
FIG. 2B illustrates an air bearing surface view of a read structure in accordance with an embodiment of the present invention.

An air bearing surface (ABS) of the head 60 is a surface of the head 60 that faces a top surface 53 of the recording layer 52 of the recording medium 50 when the head 60 is flying over the recording medium 50. FIG. 2B illustrates an air bearing surface view of the read structure 70. As illustrated in FIG. 2B, the read structure 70 may further comprise a first permanent magnet 72 and a second permanent magnet 73 located on opposite sides of the read element 71 and located at least partially between the top read shield 74 and the bottom read shield 76. The first permanent magnet 72 and the second permanent magnet 73 may be used in conjunction with the read element 71 if, for example, the read element 71 comprises a GMR read element or the like, to align free layers within the GMR read element.

As illustrated in FIG. 2B, the bottom read shield 76 has a bottom read shield width 103. In the embodiment of FIG. 2B, the bottom read shield structure 75 only comprises the bottom read shield 76, so a width of the bottom read shield structure 75 is the same as the bottom read shield width 103. Also, the top read shield 74 has a top read shield width 107.

The top read shield 74 and the bottom read shield 76 are designed to attempt to allow the read element 71 to react to magnetic fields provided from a portion of the recording medium 50 that is directly under the read element 71 during a read operation, by attempting to shield the read element 71 from stray magnetic fields provided from neighboring portions of the recording medium 50. Thus, in various embodiments, the top read shield 74 and the bottom read shield 76 may be designed to capture perpendicular stray magnetic fields to prevent crosstalk with adjacent data tracks on the recording medium 50.

When the top read shield 74 and the bottom read shield 76 are designed to capture perpendicular stray magnetic fields from the recording medium 50, they also capture external stray magnetic fields that are produced external to the head/media structure 40. A direction of perpendicular stray magnetic fields is indicated by an arrow in FIG. 2A as being perpendicular to the top surface 53 of the recording layer 52 of the recording medium 50. As previously noted, external stray magnetic fields may be generated by many external sources including, but not limited to, motors, magnets, electric currents, and the like. For example, external stray magnetic fields entering a particular disk drive may be caused by drive motors of adjacent disk drives that are in a same enclosure with the particular disk drive. Also, with disk drives placed in televisions, automobiles, computers, and the like, there are many potential sources of external stray magnetic fields, such as power supplies, motors, electric circuits, and the like.

Traditional read shields are designed to have good domain structures, so as to reduce an amount of domain noise produced by the read shields that could affect a read element. As a consequence, a thickness of traditional read shields has been set so as to attempt to ensure good domain structures for the read shields. The designing of traditional read shields with thicknesses to ensure good domain structures has caused read shields to be manufactured with much greater heights than thicknesses.

The geometries of traditional read shields cause external stray magnetic fields that are captured by the read shields to be focused and greatly magnified at an air bearing surface of the read shields. The focusing and magnifying of captured external stray magnetic fields may lead to problems such as: (i) erasing portions of a recording medium; (ii) adversely affecting a reading of data by a read element; (iii) inducing domain noise in a SUL of a recording medium; and (iv) adversely affecting a writing of data by a write structure. Each of the problems caused by the focusing and magnifying of external stray magnetic fields captured by traditionally sized read shields will now be discussed in further detail.

Erasure of data on a recording medium may result from a focusing and magnifying of captured external stray magnetic fields by traditionally sized read shields. Each recording medium has an associated nucleation value defined by a hysteresis loop, where the nucleation value represents a value of a magnetic field that is able to cause a grain in the recording medium to flip magnetization direction irreversibly when applied to the recording medium. For example, for various types of recording media, an applied magnetic field with strength around 2000 Oe may be sufficient to cause grains in the recording media to flip magnetization direction irreversibly and, thus, lead to erasure of the recording media. It should be appreciated that different types of recording media have different nucleation values.

In traditional perpendicular disk drives, it has been observed that an external stray magnetic field with strength of approximately 50 Oe or more is enough to cause irreversible disk drive failure due to erasure of servo data from a recording medium in the disk drive. In an analysis performed by the first named inventor of the present application as filed, traditionally sized read shields were found to provide large magnetic fields in the presence of an external stray magnetic field that can explain the erasure of a recording medium even for relatively small external stray magnetic fields. For example, with some read shields having traditional geometries, an external stray magnetic field with a strength of approximately 50 Oe may be captured, focused, and magnified by the traditional read shields to provide a magnetic field at portions of a recording medium under the read shields with a strength of approximately 2000 Oe. Thus, the focusing and magnifying of external stray magnetic fields by traditionally sized read shields can account for an erasure of a recording media even for a relatively small external stray magnetic field.

A reading of data from a recording medium by a read element may also be adversely affected by a focusing and magnifying of captured external stray magnetic fields by traditionally sized read shields. In traditional perpendicular disk drives, it has been observed that there is a loss of performance during read operations when the disk drives are subjected to external stray magnetic fields. Such loss of performance has been noticed even for relatively small external stray magnetic fields. For instance, there may be, for example, one order of BER loss for a 10 Oe external stray magnetic field.

In an analysis performed by the first named inventor of the application as filed, it was determined that traditionally sized read shields focus and magnify captured external stray magnetic fields at a level of a read element, which may lead to a change in asymmetry of the read element. In various read elements, a range over which a sensing by the read element is linear is finite, and if the read element is biased to be outside of the region of linearity, then there is a resulting BER loss. Additional perpendicular magnetic fields provided by traditionally sized read shields due to a focusing and magnifying of captured external stray magnetic fields may cause a read element to operate outside of a region of linearity and, thus, lead to a loss of performance by the read element. Moreover, longitudinal magnetic fields caused by the traditionally sized read shields due to a focusing and magnifying of captured external stray magnetic fields may change a gain and stability of a read element and may also demagnetize permanent magnets located adjacent to the read element.

Domain noise in a SUL of a recording medium may be induced by a focusing and magnifying of captured external stray magnetic fields by traditionally sized read shields. SUL magnetization may typically be pointed from an inner radius of a recording medium to an outer radius of the recording medium and visa versa. When a magnetization of a SUL is not uniform across a recording medium, there may be a generation of a magnetic fields at interfaces of portions of the SUL with reversed magnetizations. In an analysis performed by the first named inventor of the application as filed, it was determined that magnetic fields provided by traditionally sized read shields due to a focusing and magnifying of captured external stray magnetic fields can reverse a magnetization of small pieces of a SUL of a corresponding recording medium from their original orientation and, thus, induce SUL domain noise.

A writing of data to a recording medium by a write element may also be adversely affected by a focusing and magnifying of captured external stray magnetic fields by traditionally sized read shields. Because read elements and write elements may be located close together in various heads, some magnetic fields may leak from a read shield to a write structure. Such magnetic fields may cause problems such as: (i) pole lockup; and (ii) write asymmetry. Pole lockup may be caused when a write pole remains in a magnetized state even when no current is applied to coils for the corresponding write structure. A magnetic field that is leaked to a write structure from a read shield may keep the write pole in a magnetized state and cause the write pole to write data at an inappropriate time. Write asymmetry may result in writing data at a wrong location if a stray magnetic field leaked from a read shield biases a magnetic field in a write structure. Such writing at wrong locations lowers a reliability of a corresponding disk drive.

Embodiments of the present invention address the above-noted problems with traditionally sized read shields by increasing an effective thickness of read shields taking into account an effect of external stray magnetic fields on the read shields. By increasing a thickness of one or both of the bottom read shield 76 and the top read shield 74 as compared with traditional read shields, there is more mass in the thicker read shields to spread out a captured external stray magnetic field. Also, by increasing a thickness of one or both of the bottom read shield 76 and the top read shield 74, there may be a greater surface area at an air bearing surface of the shields to spread out captured external stray magnetic fields and, thus, a focusing and a magnifying of the captured external stray magnetic fields may be reduced as compared with traditionally sized read shields.

Increasing a thickness of one or both of the bottom read shield 76 and the top read shield 74 is different from reducing a height of one or both of the bottom read shield 76 and the top read shield 74. Reducing a height of a read shield may interfere with a needed thermal path for removing heat from parts of the head 60, which can degrade other drive performance. However, embodiments of the present invention also allow for changing a height of one or both of the bottom read shield 76 and the top read shield 74 as compared with traditionally sized read shields.

Figure 3:
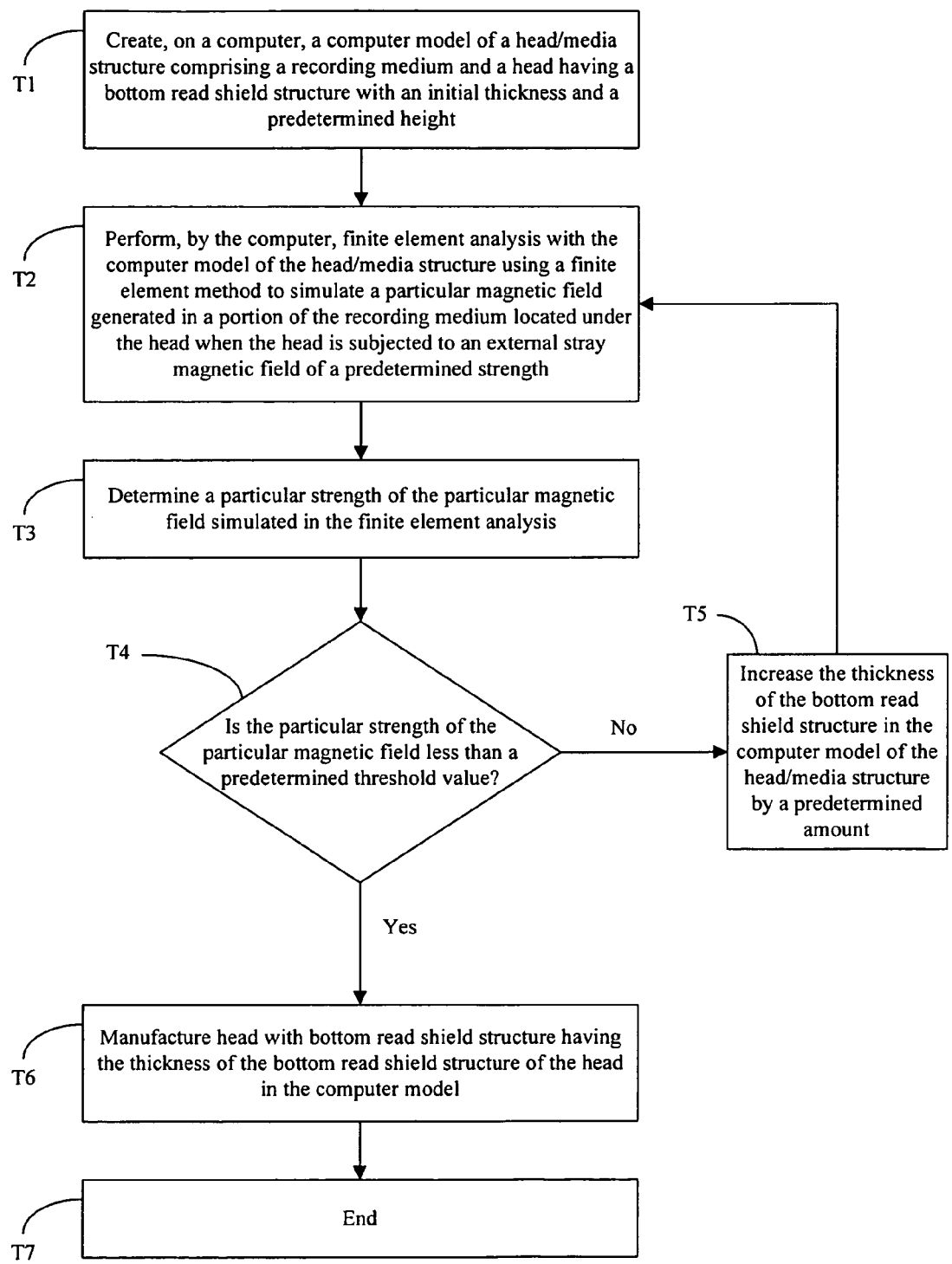
FIG. 3 illustrates a process in accordance with an embodiment of the present invention for setting a thickness of a read shield structure.
Figure 4:
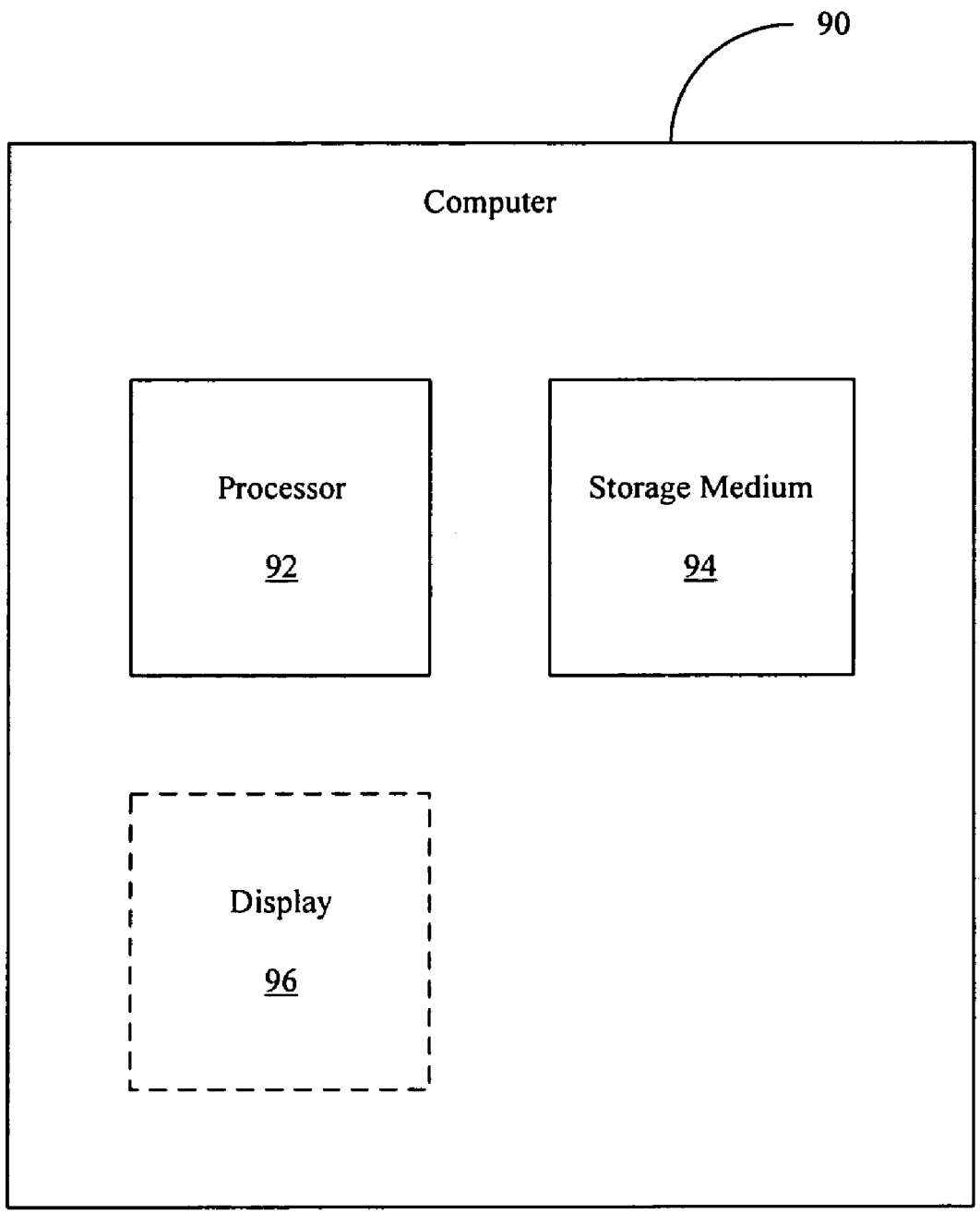
FIG. 4 illustrates a computer used in an embodiment of the present invention.

FIG. 3 illustrates a process in accordance with an embodiment of the present invention for setting a thickness of a read shield structure. At least part of the process in FIG. 3 requires a computer. FIG. 4 illustrates a computer 90 comprising a processor 92 for executing program instructions, a storage medium 94 for storing computer programs and data, and an optional display 96 for displaying information. The process of FIG. 3 will now be described in detail.

In T1, a computer model of a head/media structure is created on the computer 90. The computer 90 may store a computer program in the storage medium 94 that allows for the creation of the computer model of the head/media structure. The computer model of the head/media structure comprises a recording medium and a head having a bottom read shield structure with an initial thickness and a predetermined height. The initial thickness and the predetermined height may be set, for example, based on prior art read shield geometries that are optimized for good domain structures. In various embodiments, the bottom read shield structure only comprises a bottom read shield, in which case a thickness and a height of the bottom read shield would be the same as the thickness and the height of the bottom read shield structure. In various embodiments, the computer model of the head/media structure created in T1 may be, for example, a model of the head/media structure 40. The process then continues to T2.

In T2, the computer 90 performs finite element analysis with the computer model of the head/media structure using a finite element method to simulate a particular magnetic field generated in a portion of the recording medium located under the head when the head is subjected to an external stray magnetic field of a predetermined strength. Finite element analysis is a computer simulation technique that uses a numerical technique called the finite element method. There exist computer programs for performing finite element analysis. Such a computer program may be stored on the storage medium 94 of the computer 90 for performing the finite element analysis simulation.

The predetermined strength of the external stray magnetic field may be set to any value and may be, for example, 10 Oe, 50 Oe, 100 Oe, or any other value. The portion of the recording medium in which the magnetic field is generated may be any desired portion of the recording medium and may be, for example, a portion of the recording medium that is directly under an edge of the bottom read shield structure of the head, a portion of the recording medium that is directly under a read element of the head, a portion of the recording medium that is directly under a write pole of the head, a portion of the recording medium that is directly under a write shield of the head, or the like. The process then continues to T3.

In T3, a particular strength of the particular magnetic field simulated in the finite element analysis is determined, and the process continues to T4. In T4, it is determined whether or not the particular strength of the particular magnetic field is less than a predetermined threshold value. The predetermined threshold value may be set to any value, and may be selected, for example, based on the portion of the recording medium in which the particular magnetic field was generated.

For instance, if the portion of the recording medium in which the magnetic field is generated is a portion of the recording medium that is directly under an edge of the bottom read shield structure of the head, then the predetermined threshold value may be set to a nucleation value of the recording medium, such as 2000 Oe, 3000 Oe, or any other value. Such a value would allow for determining whether or not the particular magnetic field generated is strong enough to cause erasure of the recording medium. Also, for instance, if the portion of the recording medium in which the magnetic field is generated is a portion of the recording medium that is directly under a read element of the head, then the predetermined threshold value may be set to a value at which an asymmetry may be caused in the head, such as 150 Oe, 200 Oe, or any other value. Such a value would allow for determining whether or not the particular magnetic field generated is strong enough to cause an asymmetry in the read element.

If it is determined in T4 that the particular strength of the particular magnetic field is not less than the predetermined threshold value, then the process continues to T5. In T5, a value of the thickness of the bottom read shield structure in the computer model of the head/media structure is increased by a predetermined amount. The predetermined amount may be any amount and may be, for example, 0.5 µm, 1 µm, or any other value. The process then returns to T2. On the other hand, if it is determined in T4 that the particular strength of the particular magnetic field is less than the predetermined threshold value, then the process continues to T6.

In T6, a head is manufactured with a bottom read shield structure having a same thickness as the thickness of the bottom read shield structure of the head in the computer model. In various embodiments, the computer 90 displays a value of the thickness of the bottom read shield structure in the computer model on the display 96 of the computer 90. The process then ends in T7.

The process illustrated in FIG. 3 may be used, for example, to determine the bottom read shield thickness 104 of the bottom read shield 76 of the bottom read shield structure 75 of the head 60 illustrated in FIG. 2A. In various embodiments, the process illustrated in FIG. 3 may be used to determine a thickness of a top read shield by substituting the top read shield into the process of FIG. 3 for the bottom read shield structure. Also, in various embodiments, a thickness of a bottom read shield and a thickness of a top read shield may both be determined at a same time through a process similar to the process of FIG. 3 using finite element analysis to simulate effects of external stray magnetic fields.

In accordance with the process illustrated in FIG. 3, a thickness of a read shield may be repeatedly increased by predetermined increments in a computer model until a finite element analysis using the computer model indicates that a particular magnetic field produced by the capturing, focusing, and magnifying of an external stray magnetic field by the read shield is less than a predetermined value. As a consequence, a thickness of read shields may be set in view of an effect of the read shields in the presence of external stray magnetic fields and, hence, a desired reliability of a disk drive in the presence of external stray magnetic fields of certain strengths may be obtained. The process may be repeated with different predetermined strengths of the external stray magnetic field and different predetermined threshold values in order to check for various different issues, such as possible erasure of a recording medium, possible asymmetry of a read element, possible domain noise in a SUL, possible pole lockup in a write structure, or the like.

Figure 5:
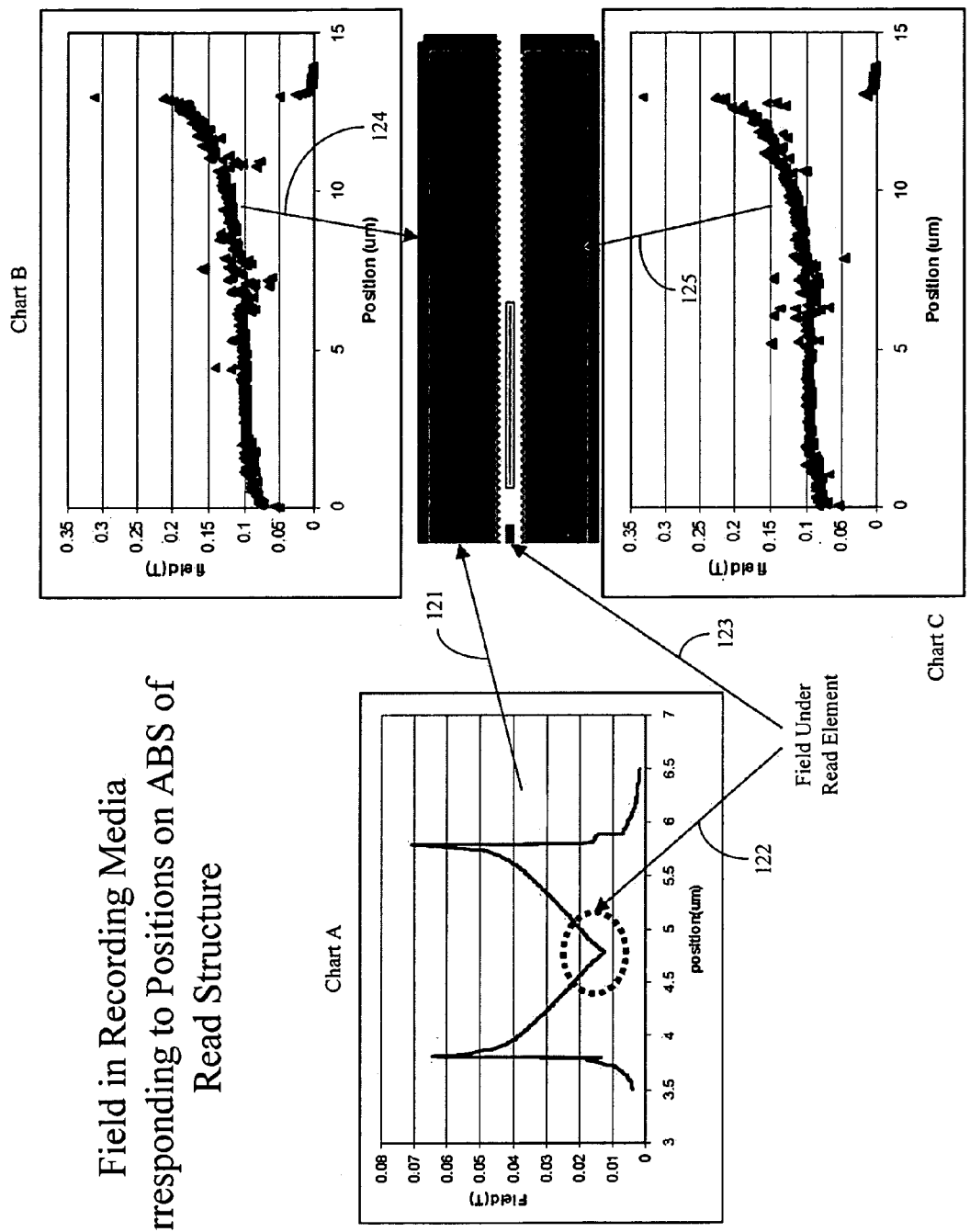
FIG. 5 illustrates a sample result of a finite element method simulation in accordance with an embodiment of the present invention.

FIG. 5 illustrates a sample result of a finite element method simulation. The charts in FIG. 5 show magnetic field strengths for various positions in a recording medium corresponding to positions on an air bearing surface of a read structure. The finite element method simulation was performed with, for example, a 100 Oe applied external stray magnetic field. The resulting field strengths are expressed in Teslas, where 1 Tesla (T) is equivalent to 10,000 Oe. Chart A in FIG. 5 illustrates a magnetic field strength for various positions across a centerline that crosses through a read element in an air bearing surface of a read structure. Arrow 122 points to values in Chart A that correspond to magnetic field strengths in a recording medium corresponding to a position in the recording medium that is under a read element pointed to by arrow 123. The values pointed to by arrow 122 are important in determining whether or not an asymmetry may be caused in a read element due to a focusing and magnifying of captured external stray magnetic fields by read shields.

Chart B and Chart C in FIG. 5 illustrate magnetic field strengths in various positions in a recording medium that correspond to positions along edges of read shields pointed to by arrows 124 and 125 respectively. As illustrated in Charts B and C of FIG. 5, magnetic field strengths in the read shields due to external stray magnetic fields are greatest at corners of the edges of the read shields. The values of the magnetic fields generated from the edges of the read shields are important in determining whether or not an erasure of a recording medium may be caused due to a focusing and magnifying of captured external stray magnetic fields by read shields.

Figure 6:
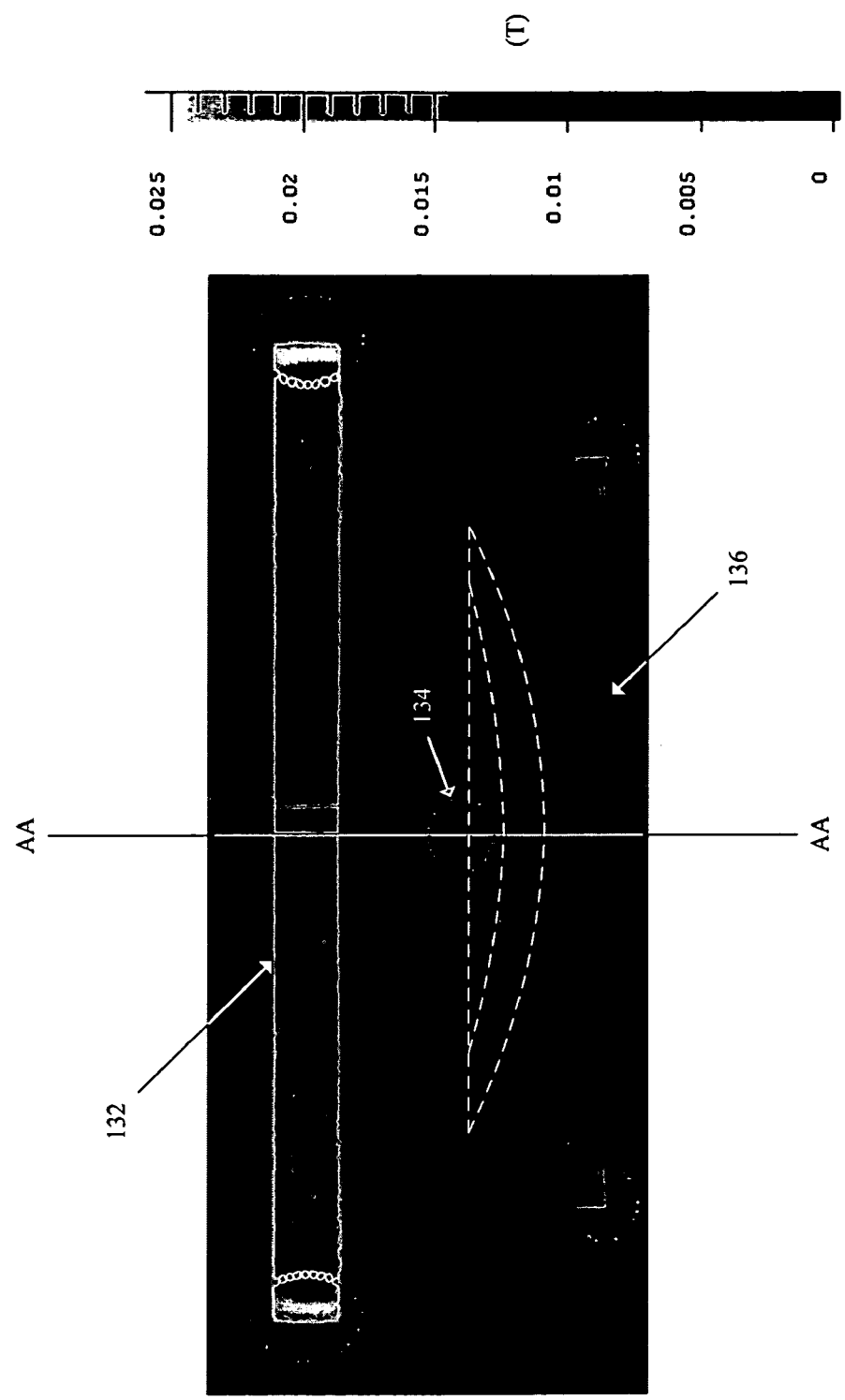
FIG. 6 illustrates a shading plot map of a result of a finite element method simulation in accordance with an embodiment of the present invention.

FIG. 6 illustrates a shading plot map of magnetic field strength in a recording medium output from a finite element method simulation of a computer model of a head/media structure including the recording medium and a head with read shields. The finite element method simulation was performed to simulate an effect of an applied external stray magnetic field. Dashed white lines are used in FIG. 6, where needed, to emphasize contours of shading. Dotted ellipses are used in FIG. 6 to denote various regions of interest. Arrow 132 points to a magnetic field strength in the recording medium corresponding to a position of the recording medium that is under a top read shield of the head in the computer model. As illustrated in FIG. 6, the magnetic field strength in the recoding medium is strongest under the corners of the top read shield. The values of the magnetic fields generated from the edges and corners of the top read shield are important in determining whether or not an erasure of a recording medium may be caused due to a focusing and magnifying of captured external stray magnetic fields by the top read shield.

Arrow 134 points to a circled area at centerline AA with a magnetic field strength in the recording medium in the computer model that corresponds to a position of the recording medium that is under a write pole of the head in the computer model. As illustrated in FIG. 6, there is a moderate field concentration in the recording medium in the vicinity of the write pole. The strength of the magnetic field in the vicinity of the write pole is important in determining whether or not external stray magnetic fields with the simulated strength may cause pole lockup in the write pole. Arrow 136 points to a magnetic field strength in the recording medium corresponding to a position of the recording medium that is under a write shield of the head in the computer model. As illustrated in FIG. 6, there is a moderately high field concentration in the recording medium of the computer model in areas under the edges of the write shield. The strengths of the magnetic fields near the edges of the write shield are important in determining whether or not external stray magnetic fields with the simulated strength may cause a write asymmetry by shifting a position where a writing of data occurs.

Figure 7:
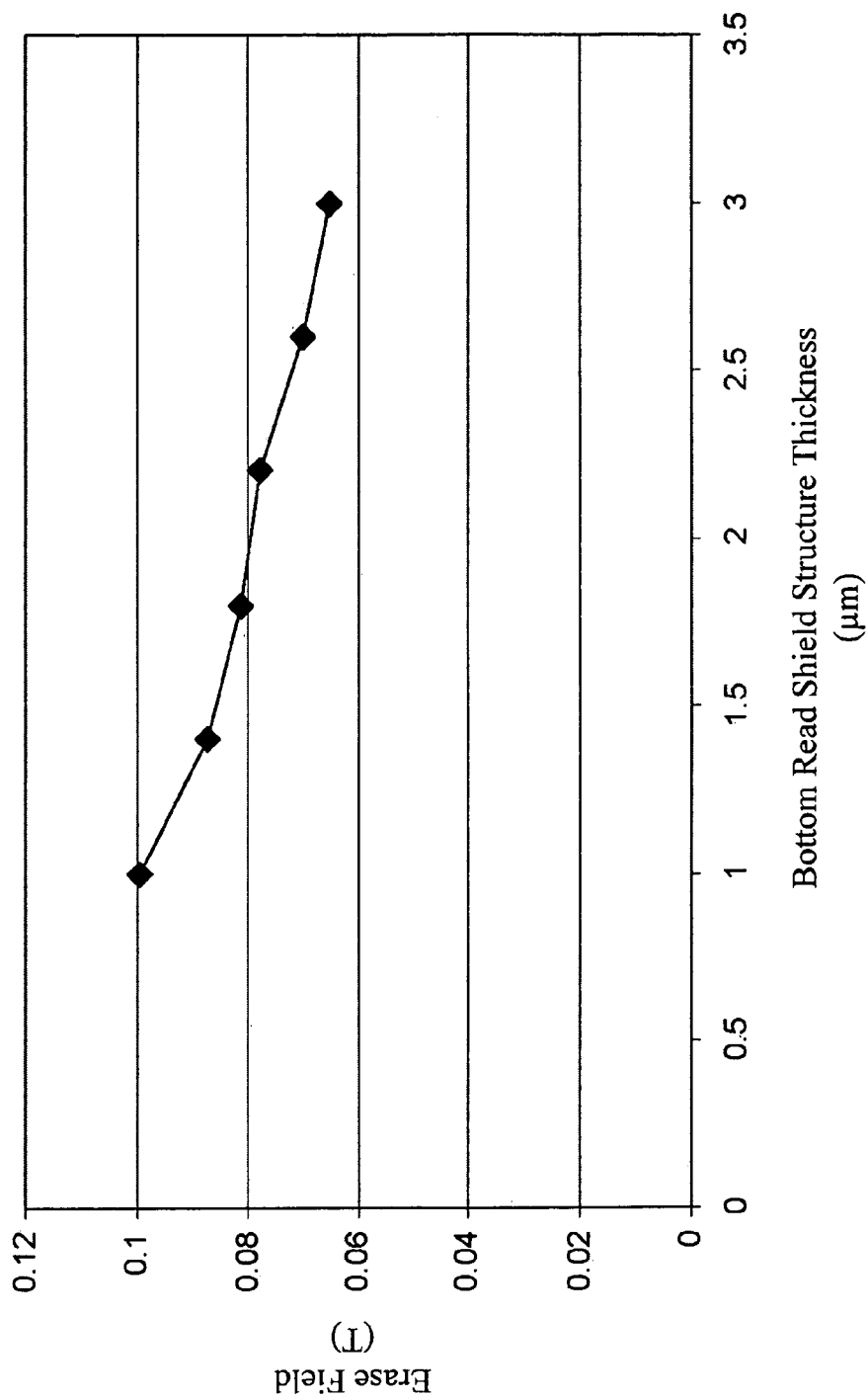
FIG. 7 illustrates a graph showing a strength of an erase field in a recording medium versus a thickness of a bottom read shield structure in accordance with an embodiment of the present invention.

FIG. 7 illustrates a graph showing that a strength of an erase field in a recording medium due to external stray magnetic fields captured by a bottom read shield structure may be decreased by increasing a thickness of the bottom read shield structure. It should be noted that the numbers in the graph of FIG. 7 are merely representative numbers, and that the bottom read shield structure thickness may be set to any desired value. For example, a bottom read shield structure thickness in a computer model may be set to 1 µm, and then a finite element method simulation may be performed to determine a magnetic field strength in a portion of a recording medium in the computer model that is under the bottom read shield structure. By repeatedly increasing the bottom read shield structure thickness in the computer model and performing finite element method simulation after each increase in thickness, the erase field that is expected to be generated for a given strength of an external stray magnetic field may be brought under a desired threshold value.

Referring again to FIG. 2A, in various embodiments, the bottom read shield thickness 104 may be set such that a ratio of the bottom read shield thickness 104 to the bottom read shield height 102 is greater than a predetermined ratio value that is determined by finite element analysis. In some embodiments, the ratio of the bottom read shield thickness 104 to the bottom read shield height 102 is greater than 0.2. Also, in various embodiments, the bottom read shield thickness 104 is set such that a highest strength of magnetic fields provided from the bottom read shield 76 when in the presence of an external stray magnetic field of a predetermined strength is not strong enough to erase data on the recording medium 50. In some embodiments, the bottom read shield thickness 104 is set such that a strength of magnetic fields provided from a portion of the bottom read shield 76 in a vicinity of the read element 71 when in the presence of an external stray magnetic field of a predetermined particular strength is not strong enough to cause an asymmetry in the read element 71.

In various embodiments, the top read shield thickness 108 may be set such that a ratio of the top read shield thickness 108 to the top read shield height 106 is greater than a predetermined ratio value that is determined by finite element analysis. In some embodiments, the ratio of the top read shield thickness 108 to the top read shield height 106 is greater than 0.2. Also, in various embodiments, the top read shield thickness 108 is set such that a highest strength of magnetic fields provided from the top read shield 74 when in the presence of an external stray magnetic field of a predetermined strength is not strong enough to erase data on the recording medium 50. In some embodiments, the top read shield thickness 108 is set such that a strength of magnetic fields provided from a portion of the top read shield 74 in a vicinity of the read element 71 when in the presence of an external stray magnetic field of a predetermined particular strength is not strong enough to cause an asymmetry in the read element 71.

Increasing the bottom read shield thickness 104 and the top read shield thickness 108 may cause bad magnetic domains in the bottom read shield 76 and the top read shield 74. Domain structures are difficult to control for large magnetic layers, so if the bottom read shield thickness 104 or the top read shield thickness 108 are too large, they may have bad domains that generate noise, which may interfere with a reading of data by the read element 71. Also, when the head 60 includes the write structure 80, increasing the top read shield thickness 108 increases a separation between the read element 71 and the write pole 81, which may be undesirable.

Figure 8A:
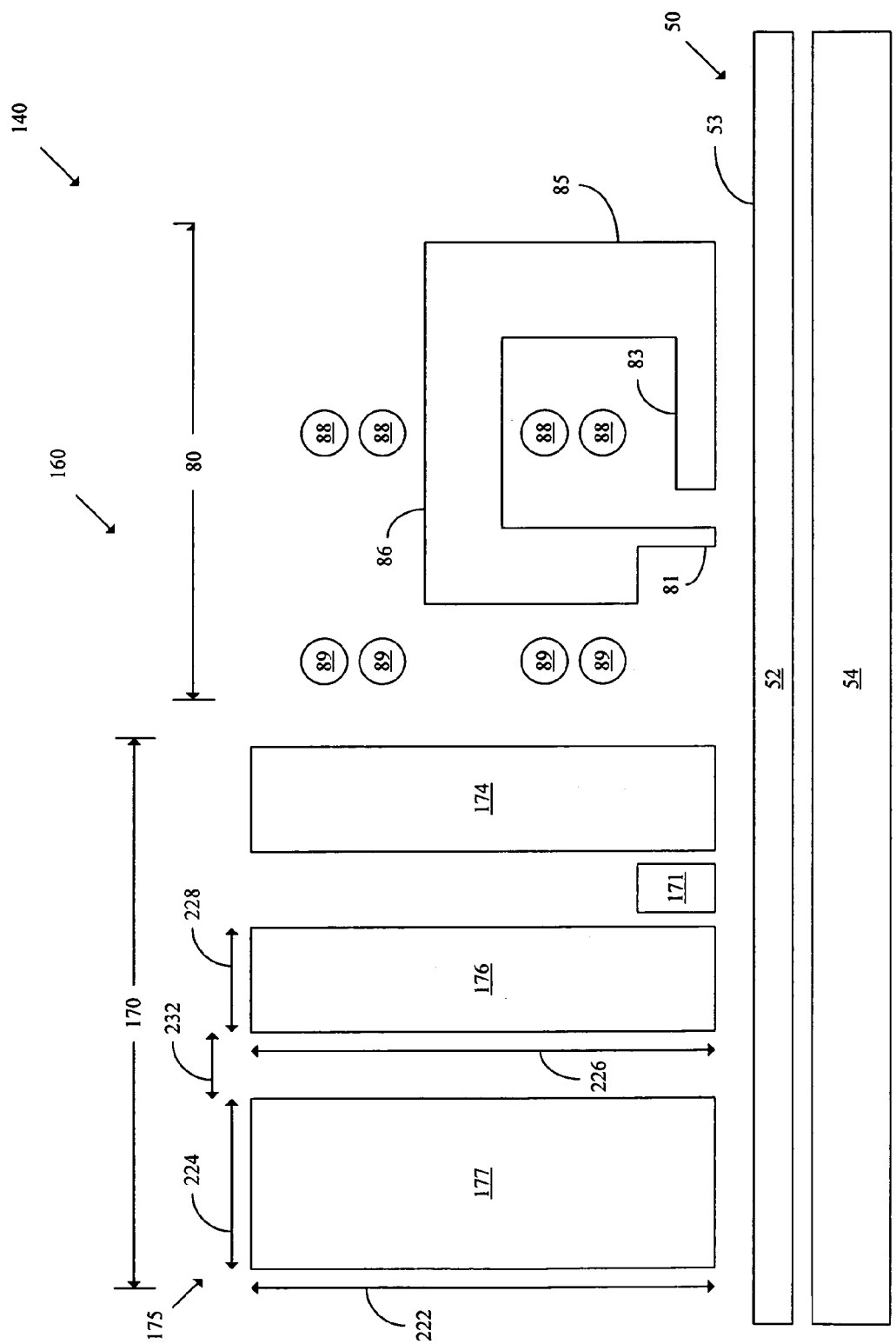
FIG. 8A illustrates a side view of a head/media structure in accordance with an embodiment of the present invention.

FIG. 8A illustrates a head/media structure 140 in accordance with an embodiment of the present invention with features that address the above-mentioned problems. Some elements that are similar between the head/media structure 140 and the head/media structure 40 (refer to FIG. 2A) are labeled with the same numeric labels for simplicity. The head/media structure 140 comprises the recording medium 50 and a head 160. The head/media structure 140 may be part of a disk drive, in which case the disk drive may further include similar components as components of the disk drive 10 (refer to FIG. 1), where the recording medium 50 would correspond to the disk 14, and the head 160 would correspond to the head 36.

The recording medium 50 comprises the recording layer 52 and the SUL 54, which have been described above with reference to FIG. 2A. In various embodiments, the head 160 comprises a read structure 170 and the write structure 80. In various other embodiments, it is possible for the head 160 to comprise only the read structure 170 without the write structure 80. The write structure 80 comprises the write pole 81, the write shield 83, the write return yoke 85, the write yoke 86, the one or more write coils 88, and the one or more bucking coils 89, which have been described above with reference to FIG. 2A. It should be noted that embodiments of the present invention are not limited to any particular type of write structure, but may include write structures with different configurations than a configuration of the write structure 80.

The read structure 170 comprises a read element 171, a top read shield 174, and a bottom read shield structure 175. The read element 171 allows for reading magnetic fields from the recording medium 50 and is similar to the read element 71 (refer to FIG. 2A). Thus, the sensor technologies discussed above with respect to the read element 71 also apply to the read element 171. In various embodiments, the read element 171 comprises a magnetoresistive read element. In some embodiments, the read element 171 comprises at least one of an AMR read element, a GMR read element, a TuMR read element, or the like.

The bottom read shield structure 175 comprises a bottom read shield 176 and a stray field shield 177. A height of the stray field shield 177 is indicated by a double-sided arrow 222, and a thickness of the stray field shield 177 is indicated by a double-sided arrow 224. A height of the bottom read shield 176 is indicated by a double-sided arrow 226, and a thickness of the bottom read shield 176 is indicated by a double-sided arrow 228. The stray field shield 177 is separated from the bottom read shield 176 by a separation distance that is indicated by a double-sided arrow 232.

An air bearing surface of the head 160 is a surface of the head 160 that faces the top surface 53 of the recording layer 52 of the recording medium 50 when the head 160 is flying over the recording medium 50. FIG. 8B illustrates an air bearing surface view of the read structure 170. As illustrated in FIG. 8B, the read structure 170 may further comprise a first permanent magnet 172 and a second permanent magnet 173 located on opposite sides of the read element 171 and located at least partially between the top read shield 174 and the bottom read shield 176. The first permanent magnet 172 and the second permanent magnet 173 may be used in conjunction with the read element 171 if, for example, the read element 171 comprises a GMR sensor or the like, to align free layers within the GMR read element. As illustrated in FIG. 8B, a width of the bottom read shield 176 is indicated by a double-sided arrow 227, and a width of the stray field shield 177 is indicated by a double-sided arrow 223.

Figure 9:
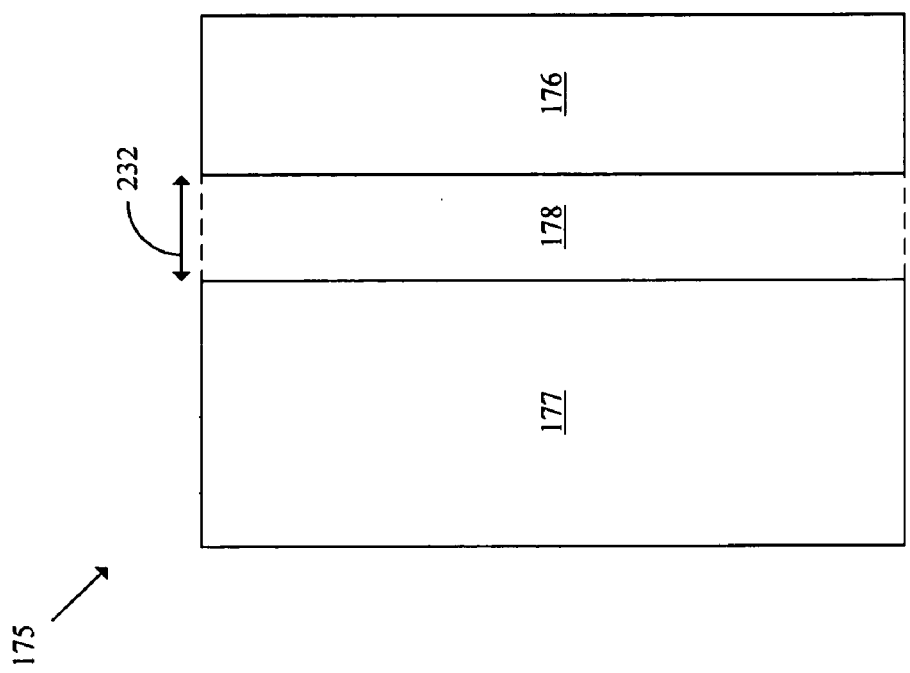
FIG. 9 illustrates a side view of a bottom read shield structure in accordance with an embodiment of the present invention.

FIG. 9 illustrates a side view of the bottom read shield structure 175 in accordance with an embodiment of the present invention. As illustrated in FIG. 9, the bottom read shield structure further comprises an exchange decoupling layer 178 located at least partially between the stray field shield 177 and the bottom read shield 176. In various embodiments, a thickness of the exchange decoupling layer is the thickness of the separation distance 232 between the stray field shield 177 and the bottom read shield 176. Elements of the read structure 170 will now be described in greater detail with reference to FIGS. 8A, 8B, and 9.

The top read shield 174 allows for at least partially shielding the read element 171 from stray magnetic fields from the recording medium 50. The bottom read shield 176 allows for at least partially shielding the read element 171 from stray magnetic fields from the recording medium 50. Also, the stray field shield 177 allows for at least partially shielding the read element 171 from stray magnetic fields from the recording medium 50. In various embodiments, the top read shield 174 comprises a magnetic material having an orientation selected to capture stray magnetic fields. Also, in various embodiments, the bottom read shield 176 comprises a magnetic material having an orientation selected to capture stray magnetic fields. Moreover, in various embodiments, the stray field shield 177 comprises a magnetic material having an orientation selected to capture stray magnetic fields.

In various embodiments, the top read shield 174, the bottom read shield 176, and the stray field shield 177 are designed to attempt to allow the read element 171 to react to magnetic fields provided by a portion of the recording medium 50 that is directly under the read element 171 during a read operation, by attempting to shield the read element 171 from stray magnetic fields provided from neighboring portions of the recording medium 50. Thus, in various embodiments, the top read shield 174, the bottom read shield 176, and the stray field shield 177 may be designed to capture perpendicular stray magnetic fields to reduce crosstalk between adjacent tracks on the recording medium 50. When the top read shield 174, the bottom read shield 176, and the stray field shield 177 are designed to capture stray magnetic fields from the recording medium 50, they also capture external stray magnetic fields that are produced by sources external to the disk drive 140.

In some embodiments, the top read shield 174 comprises a ferromagnetic material or the like. Also, in some embodiments, the top read shield 174 comprises a nickel-iron alloy or the like. In some embodiments, the bottom read shield 176 comprises a ferromagnetic material or the like. Also, in some embodiments, the bottom read shield 176 comprises a nickel-iron alloy or the like. In some embodiments, the stray field shield 177 comprises a ferromagnetic material or the like. Also, in some embodiments, the stray field shield 177 comprises a nickel-iron alloy or the like. In various embodiments, the stray field shield 177 comprises a NiFe invar like alloy or the like, where the Ni composition is between 30 and 45 atomic percent, to reduce protrusion toward the recording medium 50 of the head 160 at elevated temperatures.

The read element 171 is located at least partially between the top read shield 174 and the bottom read shield 176. In various embodiments, the read element 171 is located entirely between the top read shield 174 and the bottom read shield 176. The bottom read shield 176 is located at least partially between the stray field shield 177 and the top read shield 174. The exchange decoupling layer 178 is located at least partially between the stray field shield 177 and the bottom read shield 176. In various embodiments, the exchange decoupling layer is located entirely between the stray field shield 177 and the bottom read shield 176. Also, in various embodiments, the top read shield 174 is located at least partially between the read element 171 and the write structure 80.

The top read shield 174 and the bottom read shield 176 may be designed with heights and thicknesses so as to have good domain structures, while still allowing for shielding the read element 171 from stray fields from the recording medium 50. In various embodiments, a thickness of the bottom read shield 176 is set so as to optimize a domain stability of the bottom read shield 176 in a vicinity of the read element 171. Also, in various embodiments, the top read shield 174 and the bottom read shield 176 are designed with geometries so as to limit an amount of domain noise generated by the top read shield 174 and the bottom read shield 176 near the read element 171.

Adding the stray field shield 177 and the exchange decoupling layer 178 to the bottom read shield structure 175 allows for increasing an effective thickness of the bottom read shield structure 175 so as to reduce external stray field sensitivity, while still maintaining a good domain structure in the bottom read shield 176 so as to limit an amount of domain noise generated by the bottom read shield 176 near the read element 171.

By adding the stray field shield 177 to the bottom read shield structure 175 in addition to the bottom read shield 176, the stray field shield 177 is able to capture some of the external stray magnetic fields that enter the disk drive 140 from external sources and to spread out the captured external stray magnetic fields so as to reduce a capturing, focusing, and magnifying of external stray magnetic fields by the bottom read shield 176 and the top read shield 174. As a consequence, strengths of magnetic fields generated in the bottom read shield 176 and the top read shield 174 due to external stray magnetic fields of given strengths may be reduced with the addition of the stray field shield 177. Reducing the strengths of magnetic fields generated in the bottom read shield 176 and the top read shield 174 due to external stray magnetic fields helps to reduce unwanted erasure of the recording medium 50 and helps to reduce a creation of an asymmetry in the read element 171.

The exchange decoupling layer 178 at least partially provides exchange decoupling of the stray field shield 177 and the bottom read shield 176, so as to decouple a domain structure of the stray field shield 177 from a domain structure of the bottom read shield 176. In various embodiments, the bottom read shield 176 may have a thickness 228 that is optimized for domain stability, and the exchange decoupling layer 178 provides exchange decoupling of the stray field shield 177 and the bottom read shield 176 so as to reduce or minimize an effect of domains in the stray field shield 177 on domains in the bottom read shield 176. Thus, in various embodiments, the exchange decoupling layer 178 allows for keeping a good domain structure in the bottom read shield 176 by decoupling a domain of the bottom read shield 176 from a domain of the stray field shield 177.

The exchange decoupling layer 178 may comprise any suitable material for providing exchange decoupling of the stray field shield 177 and the bottom read shield 176. In various embodiments, the exchange decoupling layer 178 comprises a non-magnetic material. One important issue to consider when selecting a material for the exchange decoupling layer 178 is the issue of magnetostriction, which is that a magnetization of the bottom read shield 176 may be changed by applying a stress to the bottom read shield 176. In order to reduce a change in a magnetization of the bottom read shield 176 due to the exchange decoupling layer 178 and, thus, to have a low magnetostriction effect in the bottom read shield 176, a material may be selected for the exchange decoupling layer 178 that is designed to reduce or limit or minimize an amount of stress placed on the bottom read shield 176.

In order to reduce an amount of stress placed on the bottom read shield 176, a malleable material may be selected for the exchange decoupling layer 178. In various embodiments, the stray field shield 177 comprises a material, the exchange decoupling layer 178 comprises a particular material, and the particular material of the exchange decoupling layer 178 is more malleable than the material of the stray field shield 177. In various embodiments, the exchange decoupling layer comprises at least one of copper, chromium, gold, silver, platinum, iridium, tantalum, titanium, tungsten, or the like. Copper may be a good choice for the exchange decoupling layer 178, because copper could provide adequate exchange decoupling of the stray field shield 177 and the bottom read shield 176, and, copper is relatively malleable so it could limit an amount of stress placed on the bottom read shield and, thus, aid in controlling magnetostriction effects in the bottom read shield 176. In various embodiments, gold may be preferred for the exchange decoupling layer 178 in order to minimize susceptibility to corrosion. Alternatively, if the magnetostriction of the bottom read shield 176 is low enough to prevent domain structure problems due to high stress, then a mechanically strong material such as titanium, chrome, or the like may be preferred for the exchange decoupling layer 178. This would help minimize protrusion of the head 160 at elevated temperatures.

In various embodiments, a material that is a good thermal conductor may be selected for the exchange decoupling layer 178 in order to take heat out of the bottom read shield 176 and, thus, to help limit an amount of pole tip protrusion of the bottom read shield 176. Copper may also be a good choice for the exchange decoupling layer 178 to take heat out of the bottom read shield 176 and to provide a thermal path from the bottom read shield 176 to the stray field shield 177. The exchange decoupling layer 178 may have any suitable thickness for providing adequate exchange decoupling between the stray field shield 177 and the bottom read shield 176. In various embodiments, the exchange decoupling layer 178 is greater than 20 nm in thickness. Also, in various embodiments, the exchange decoupling layer 178 is greater than 1000 nm in thickness. In some embodiments, the exchange decoupling layer 178 has a thickness that is thick enough such that a domain structure of the bottom read shield 176 is unaffected by the stray field shield 177.

In various embodiments, the thickness 224 of the stray field shield 177 may be set based on finite element method simulations similar to the finite element method simulations in the process of FIG. 3. In some embodiments, the thickness 224 of the stray field shield 177 is large enough such that a strongest erase field generated by the bottom read shield 176 due to external stray magnetic fields of a predetermined strength, is less than a nucleation value of the recording medium 50, so as to prevent erasure of the recording medium 50 due to a focusing and magnifying of the external stray magnetic fields of the predetermined strength.

In various embodiments, the height 222 of the stray field shield 177 is approximately a same height and the height 226 of the bottom read shield 176. In various other embodiments, the height 222 of the stray field shield 177 is less than the height 226 of the bottom read shield 176. Also, in various other embodiments, the height 222 of the stray field shield 177 is greater than the height 226 of the bottom read shield 176. In various embodiments, a height of the top read shield 174 is approximately a same height as the height 226 of the bottom read shield 176. In some embodiments, the thickness 224 of the stray field shield 177 is thicker than the thickness 228 of the bottom read shield 176. In some embodiments, the thickness 224 of the stray field shield 177 is thicker than a thickness of the top read shield 174. Also, in some embodiments, a thickness of the top read shield 174 is approximately a same thickness as the thickness 228 of the bottom read shield 176.

In various embodiments, a ratio of the thickness 224 of the stray field shield 177 plus the thickness 228 of the bottom read shield 176 to the height 226 of the bottom read shield 176 is greater than a predetermined ratio value. In some embodiments, a ratio of the thickness 224 of the stray field shield 177 plus the thickness 228 of the bottom read shield 176 to the height 226 of the bottom read shield 176 is greater than 0.2. In various embodiments, the width 223 of the stray field shield 177 is greater than the width 227 of the bottom read shield 176. Also, in various embodiments, the width 223 of the stray field shield 177 is approximately a same width as the width 227 of the bottom read shield 176. In some embodiments, at least one edge of the stray field shield 177 is tapered.

In various embodiments, the height 222 of the stray field shield 177 is greater than a height of the read element 171. In some embodiments, the height 222 of the stray field shield 177 is more than three times a height of the read element 171. In various embodiments, the height 226 of the bottom read shield 176 is greater than a height of the read element 171. In some embodiments, the height 226 of the bottom read shield 176 is more than three times a height of the read element 171.

In various embodiments, a height of the top read shield 174 is greater than a height of the read element 171. In some embodiments, a height of the top read shield 174 is more than three times a height of the read element 171.

Figure 10:
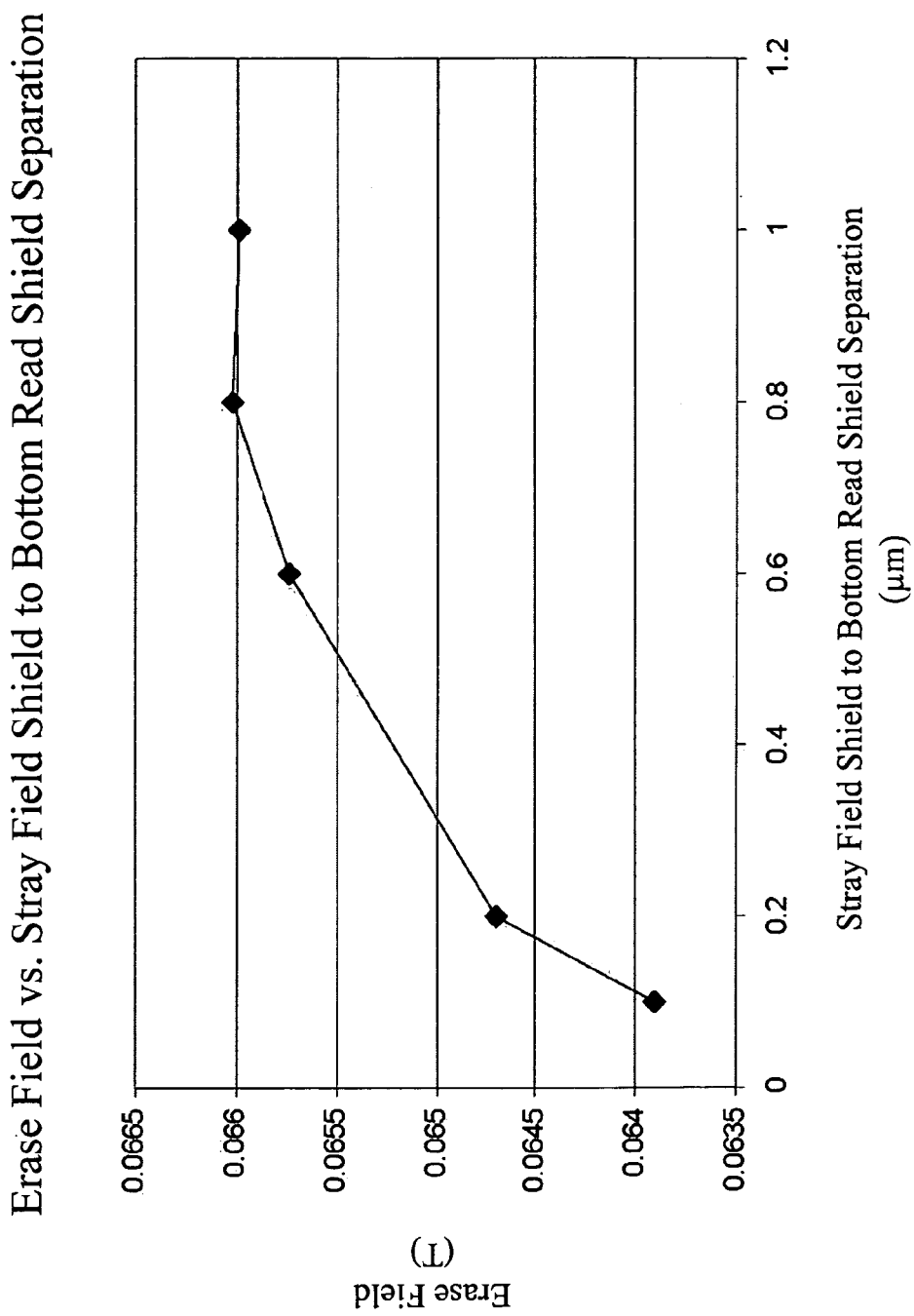
FIG. 10 is a graph with results of finite element method simulations in accordance with an embodiment of the present invention.

FIG. 10 is a graph with results of finite element method simulations in accordance with an embodiment of the present invention to illustrate an effect of the separation distance 232 of the stray field shield 177 to the bottom read shield 176 on an erase field generated in the recording medium 50 due to an applied external stray magnetic field of a predetermined strength. It should be appreciated that the numbers in the graph for the separation distance 232 of the stray field shield 177 to the bottom read shield 176 are merely illustrative of various embodiments, and that various other embodiments of the present invention may have any suitable separation distance 232 between the stray field shield 177 and the bottom read shield 176.

As illustrated in the graph of FIG. 10, from a point of view of reducing an erase field in the recording medium 50, it may be preferable to have a relatively small separation distance 232 between the stray field shield 177 and the bottom read shield 176. However, in various embodiments, the separation distance 232 between the stray field shield 177 and the bottom read shield 176 is set to be large enough to provide for adequate magnetostatic decoupling of the stray field shield 177 and the bottom read shield 176. In some embodiments, the separation distance 232 between the stray field shield 177 and the bottom read shield 176 is set such that a domain structure of the bottom read shield 176 is unaffected by the stray field shield 177.

Also, in various embodiments, the separation distance 232 between the stray field shield 177 and the bottom read shield 176 is set so as to allow for depositing a nice growth layer for the bottom read shield 176 during a manufacturing process such as to provide a good domain structure for the bottom read shield 176 and, hence, control an amount of domain noise generated by the bottom read shield 176. From the results illustrated in FIG. 10, it appears that the separation distance 232 may not be that critical of a parameter in implementing the stray field shield 177, and that an adequate separation distance 232 may be provided for magnetostatic decoupling while still allowing for a desired reduction of a generated erase field.

Figure 11:
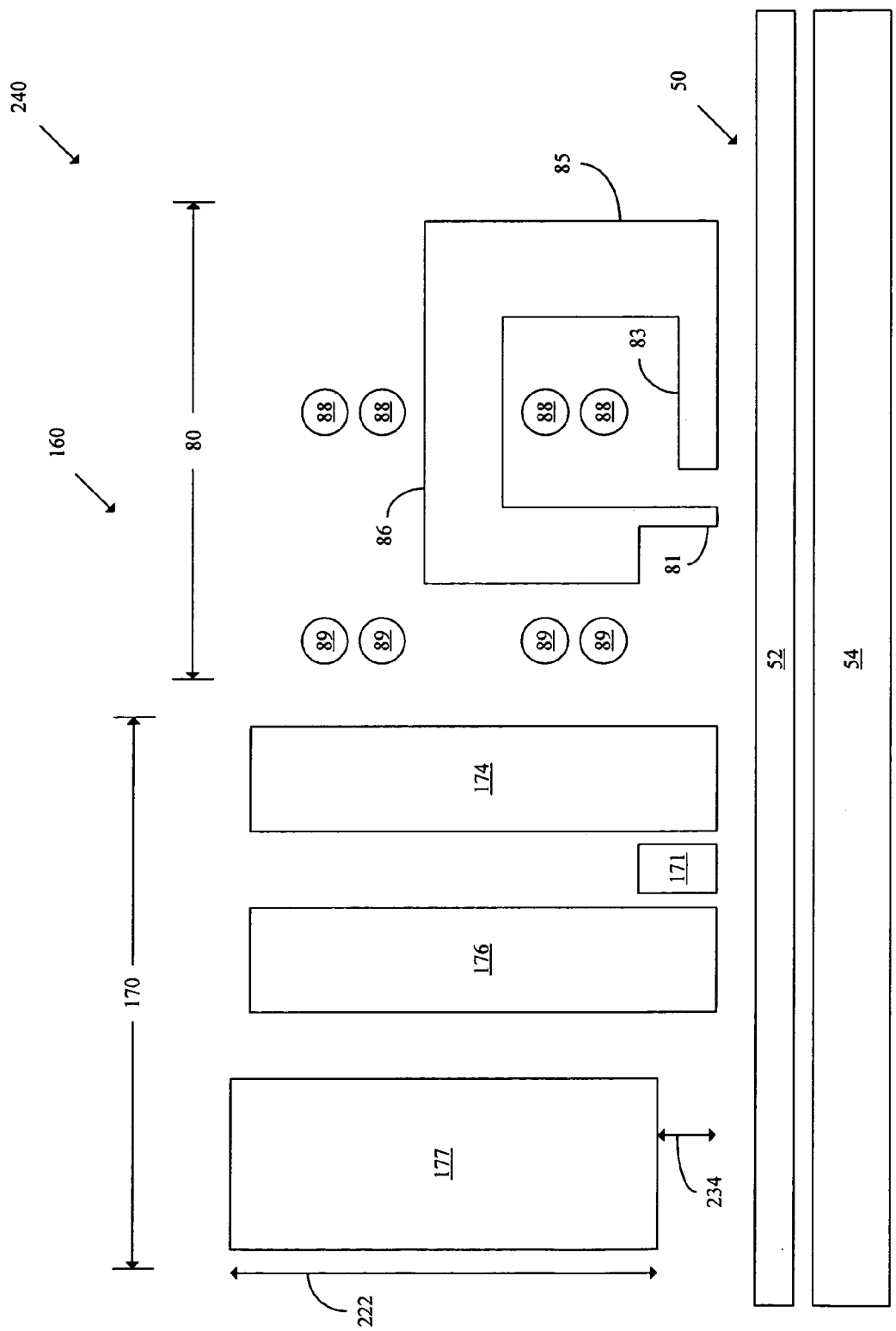
FIG. 11 illustrates a side view of a head/media structure in accordance with an embodiment of the present invention.

FIG. 11 illustrates a head/media structure 240 in accordance with an embodiment of the present invention. The head/media structure 240 has the same elements as the head/media structure 140 (refer to FIG. 8A). Additionally, in the head/media structure 240, the stray field shield 177 is recessed from the air bearing surface of the head 160 by a distance indicated by a double-sided arrow 234. Thus, in various embodiments, the stray field shield 177 may be fully or partially recessed from the air bearing surface of the head 160. The recess distance 234 of the stray field shield 177 from the air bearing surface of the head 160 may be any suitable distance. In various embodiments, the recess distance 234 is, for example, greater than 20 nm.

Recessing the stray field shield 177 from the air bearing surface of the head 160 may have advantages in reducing the magnification of stray fields at edges of the stray field shield 177. In various embodiments, the stray field shield 177 comprises a material with a low coefficient of thermal expansion, so as to help reduce an amount of pole tip protrusion of the stray field shield 177. Pole tip protrusion occurs if the stray field shield 177 is heated and expands. Pole tip protrusion may be a problem when the head 160 is flying close to the recording medium 50, because if the stray field shield 177 expands beyond the normal air bearing surface of the head 160, then it may come into contact with the recording medium 50 and possibly damage the recording medium 50.

In various embodiments, the stray field shield 177 comprises invar or the like. In some embodiments, the bottom read shield 176 comprises a first magnetic material and the stray field shield 177 comprises a second magnetic material that is a different type of material than the first magnetic material and that has a lower coefficient of thermal expansion than the first magnetic material. As a consequence, in various embodiments, the bottom read shield 176 may be designed with a material for having a good domain structure while the stray field shield 177 may be designed with a different material for reducing pole tip protrusion.

Recessing the stray field shield 177 from the air bearing surface of the head 160 may also have advantages in reducing a potential for wide area track erasure (WATER) by potentially reducing a time over which portions of the recording medium are exposed to a magnetic field provided from the stray field shield 177. However, recessing the stray field shield 177 from the air bearing surface of the head 160 may reduce its efficiency in reducing erase fields provided by the bottom read shield 176 and the top read shield 174 due to external stray magnetic fields.

Figure 12:
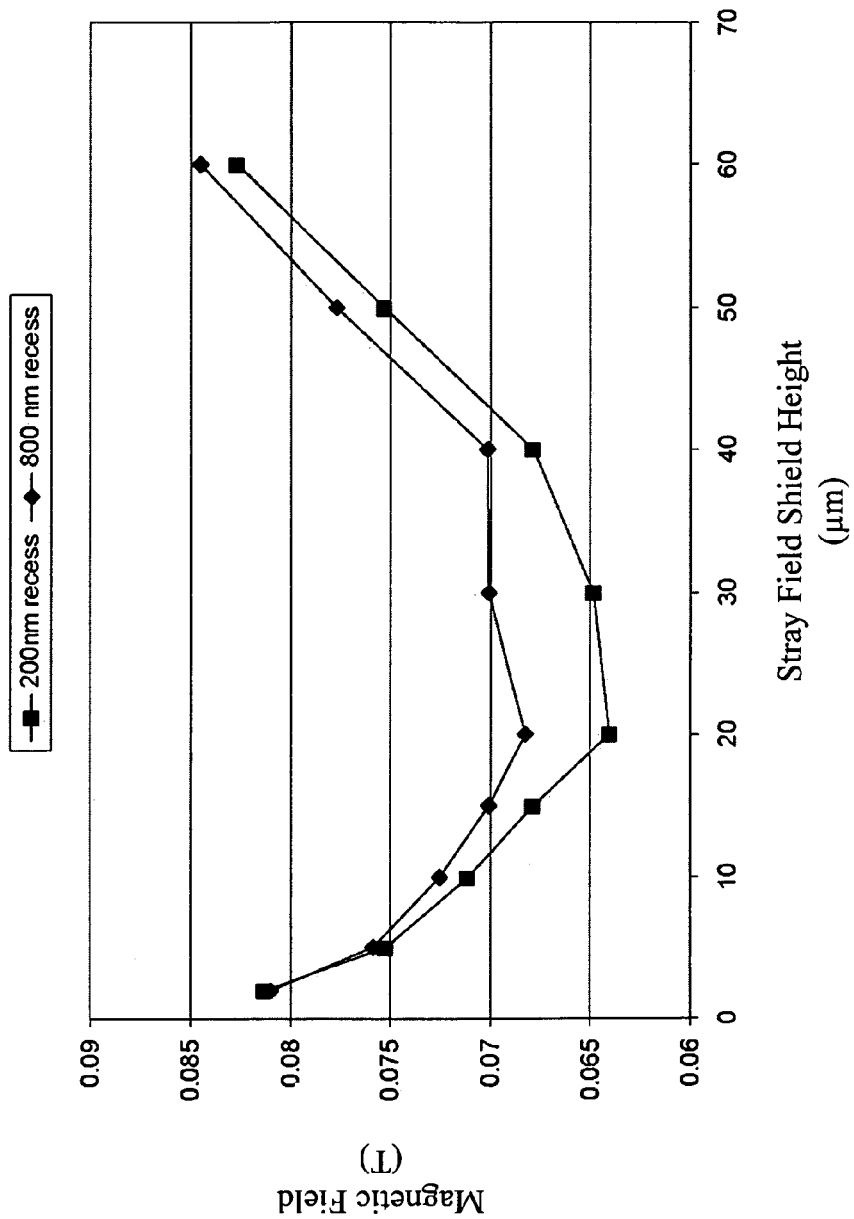
FIG. 12 is a graph with results of finite element method simulations of an embodiment of the present invention.

FIG. 12 is a graph with results of finite element method simulations of an embodiment of the present invention for illustrating effects of the height 222 of the stray field shield 177 and the recess distance 234 of the stray field shield 177 on an asymmetry field generated in a vicinity of the read element 171 due to an external stray magnetic field of a predetermined strength. It should be appreciated that the numbers for the height 222 and the recess distance 234 shown in FIG. 12 are merely illustrative of heights and recess distances for various embodiments, and that various other embodiments may have different heights and recess distances for the stray field shield 177.

In generating the results illustrated in FIG. 12, the height 226 of the bottom read shield 176 was set at 20 μm for the simulations, but it should be appreciated that the bottom read shield 176 may have any appropriate height. As illustrated in FIG. 12, in various embodiments, for reducing an asymmetry field generated due to external stray magnetic fields, an optimal design of the height 222 of the stray field shield 177 is to set the height 222 of the stray field shield 177 to a same height as the height 226 of the bottom read shield 176. However, a small variation in the height 222 of the stray field shield 177 from the height 226 of the bottom read shield 176 such as, for example, up to approximately a 15% variation, will not greatly affect a performance of the stray field shield 177. Also, as illustrated in FIG. 12, in various embodiments, increasing the recess distance 234 of the stray field shield 177 reduces an efficiency of the stray field shield 177. Thus, in various embodiments, from a point of view of reducing a generation of an asymmetry field due to an external stray magnetic field, an optimal value of the recess distance 234 of the stray field shield 177 is zero.

Figure 13:
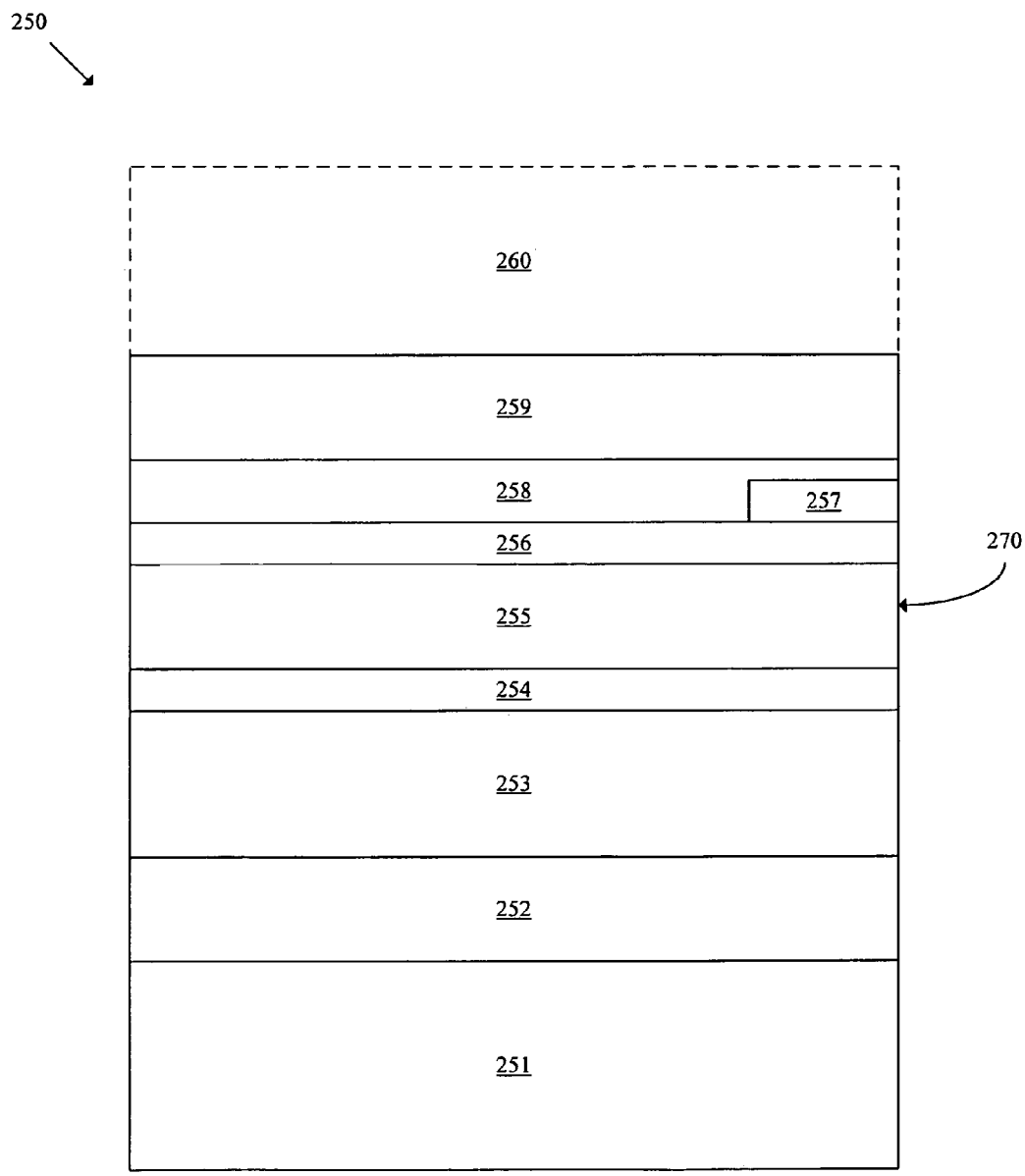
FIG. 13 illustrates a head in accordance with an embodiment of the present invention.

Relevant details of a method of manufacturing a head 250 in accordance with an embodiment of the present invention will now be discussed in conjunction with FIG. 13. The head 250 has an air bearing surface 270. A substrate 251 is provided of any suitable material for a substrate. In various embodiments, the substrate 251 comprises $Al_2O_3$/TiC, or the like. An undercoating 252 is deposited on at least a portion of the substrate 251. In various embodiments, the undercoating 252 comprises an electrically insulating material. In some embodiments, the undercoating 252 comprises a suitable material, such as alumina, or the like. A stray field shield 253 is deposited on at least a portion of the undercoating 252. In various embodiments, the stray field shield 253 comprises a magnetic material. In some embodiments, the stray field shield 253 comprises a ferromagnetic material, or the like.

An exchange decoupling layer 254 is deposited on at least a portion of the stray field shield 253. In various embodiments, the exchange decoupling layer 254 comprises a non-magnetic material. In some embodiments, the exchange decoupling layer 254 comprises copper, or the like. A bottom read shield 255 is deposited on at least a portion of the exchange decoupling layer 254. In various embodiments, the bottom read shield 255 comprises a ferromagnetic material or the like.

A first insulating layer 256 is deposited on at least a portion of the bottom read shield 255. The first insulating layer 256 may comprise any suitable material for providing insulation. In various embodiments, the first insulating layer 256 comprises $Al_2O_3$ or the like. A read element 257 is deposited on at least a portion of the first insulating layer 256. In various embodiments, the read element 257 is capable of reading magnetic fields from a recording medium. If the read element 257 comprises, for example, a GMR read element or the like, then the read element 257 may have many layers as is well known. A second insulating layer 258 is deposited on at least a portion of the read element 257. The second insulating layer 258 may comprise any suitable material for providing insulation. In various embodiments, the second insulating layer 258 comprises $Al_2O_3$ or the like.

A top read shield 259 is deposited on at least a portion of the second insulating layer 258. In various embodiments, the top read shield 259 comprises a magnetic material. In some embodiments, the top read shield 259 comprises a ferromagnetic material, or the like. A write structure 260 may then be deposited on at least a portion of the top read shield 259, where the write structure 260 may have many layers. In various embodiments, the write structure 260 is capable of focusing magnetic flux for writing data onto a recording medium.

In various embodiments, the stray field shield 253 is capable of at least partially shielding the read element 257 from stray magnetic fields. Also, in various embodiments, the bottom read shield 255 is capable of at least partially shielding the read element 257 from stray magnetic fields. In some embodiments, the top read shield 259 is capable of at least partially shielding the read element 257 from stray magnetic fields. In various embodiments, depositing the stray field shield 253 comprises depositing the stray field shield 253 on at least a portion of the undercoating 252 and recessed from the air bearing surface 270 of the head 250.

In various embodiments, the stray field shield 253 and the bottom read shield 255 are made with different masks in a manufacturing process. Using different masks for the stray field shield 253 and the bottom read shield 255 may allow for the stray field shield 253 and the bottom read shield 255 to have different heights. In various other embodiments, the stray field shield 253 and the bottom read shield 255 are made using a same mask, which may reduce a number of manufacturing steps for manufacturing the head 250.

Figure 14:
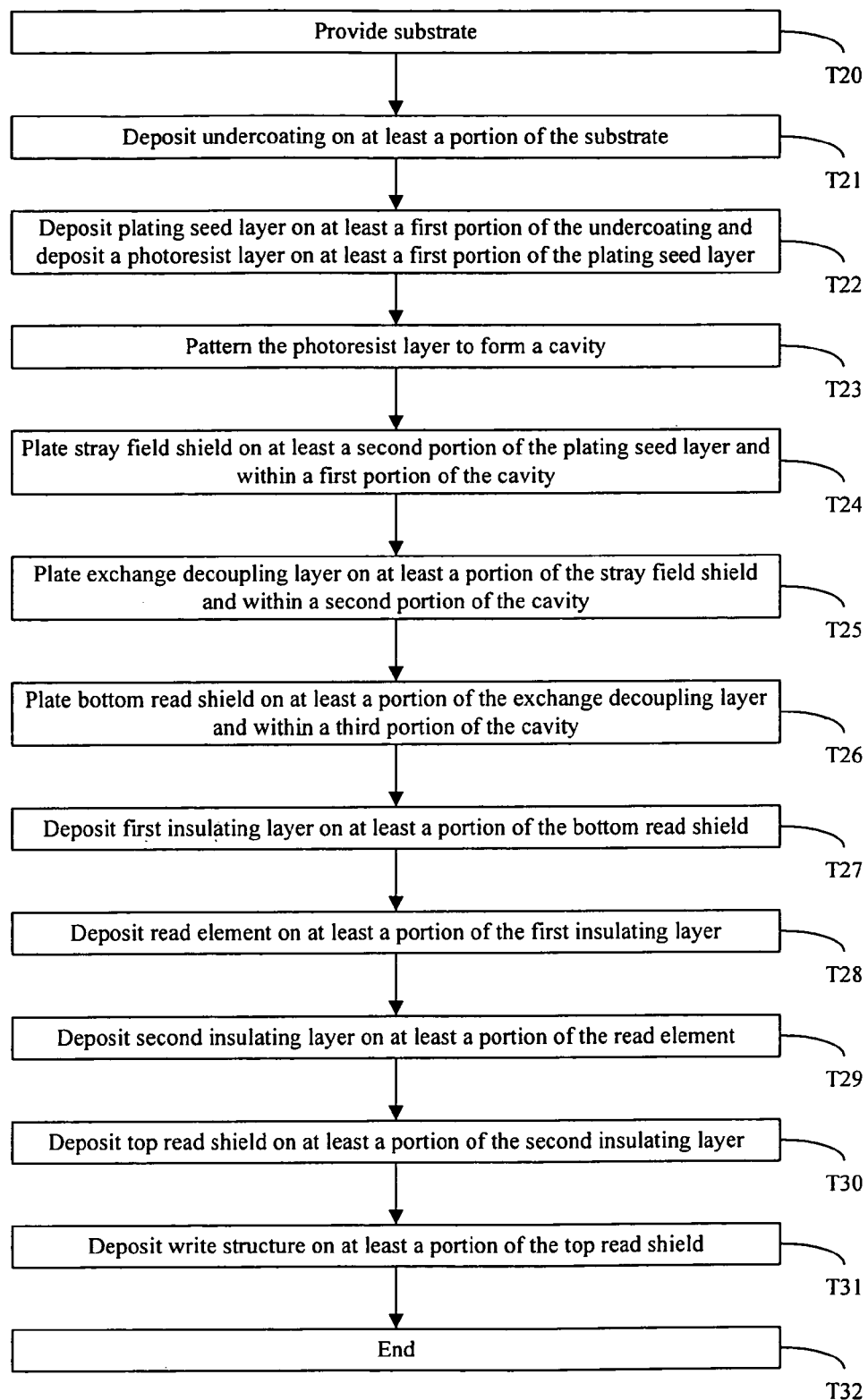
FIG. 14 illustrates a process of manufacturing a head in accordance with an embodiment of the present invention.

FIG. 14 illustrates a process of manufacturing the head 250 using a same mask for the stray field shield 253 and the bottom read shield 255 in accordance with an embodiment of the present invention. In T20, the substrate 251 is provided, and the process continues to T21. In T21, the undercoating 252 is deposited on at least a portion of the substrate 251, and the process continues to T22. In T22, a plating seed layer (not shown) is deposited on at least a first portion of the undercoating 252 and then a photoresist layer (not shown) is deposited onto at least a first portion of the plating seed layer, and the process continues to T23. In T23, the photoresist layer is patterned to form a cavity (not shown), and the process continues to T24.

In T24, the stray field shield 253 is plated on at least a second portion of the plating seed layer and the undercoating 252 and within a first portion of the cavity. In various embodiments, the first portion of the plating seed layer includes the second portion of the plating seed layer. The process then continues to T25. In T25, the exchange decoupling layer 254 is plated on at least a portion of the stray field shield 253 and within a second portion of the cavity, and the process continues to T26. In T26, the bottom read shield 255 is plated on at least a portion of the exchange decoupling layer 254 and within a third portion of the cavity, and the process continues to T27.

In T27, the first insulating layer 256 is deposited on at least a portion of the bottom read shield 255, and the process continues to T28. In T28, the read element 257 is deposited on at least a portion of the first insulating layer 256, and the process continues to T29. In T29, the second insulating layer 258 is deposited on at least a portion of the read element 257, and the process continues to T30. In T30, the top read shield 259 is deposited on at least a portion of the second insulating layer 258, and the process continues to T31. In T31, the write structure 260 is deposited on at least a portion of the top read shield 259, and the process then ends in T32.

In accordance with the process illustrated in FIG. 14, the stray field shield 253 and the bottom read shield 255 can be plated in a same cavity. By using a same cavity for plating both the stray field shield 253 and the bottom read shield 255, manufacturing steps may be conserved, because a separate mask would not be needed for each of the stray field shield 253 and the bottom read shield 255. In various embodiments, the stray field shield 253 and the bottom read shield 255 may be plated in a same or a similar bath. Also, in various embodiments, the stray field shield 253 may be deposited more quickly and with less care than with the depositing of the bottom read shield 255, because it may not be as important to have a good domain structure for the stray field shield 253 as for the bottom read shield 255. Moreover, in various embodiments, by providing an adequate spacing between the stray field shield 253 and the bottom read shield 255, a nice growth layer may be provided for the bottom read shield 255 to help ensure a good domain structure of the bottom read shield 255.

Figure 15:
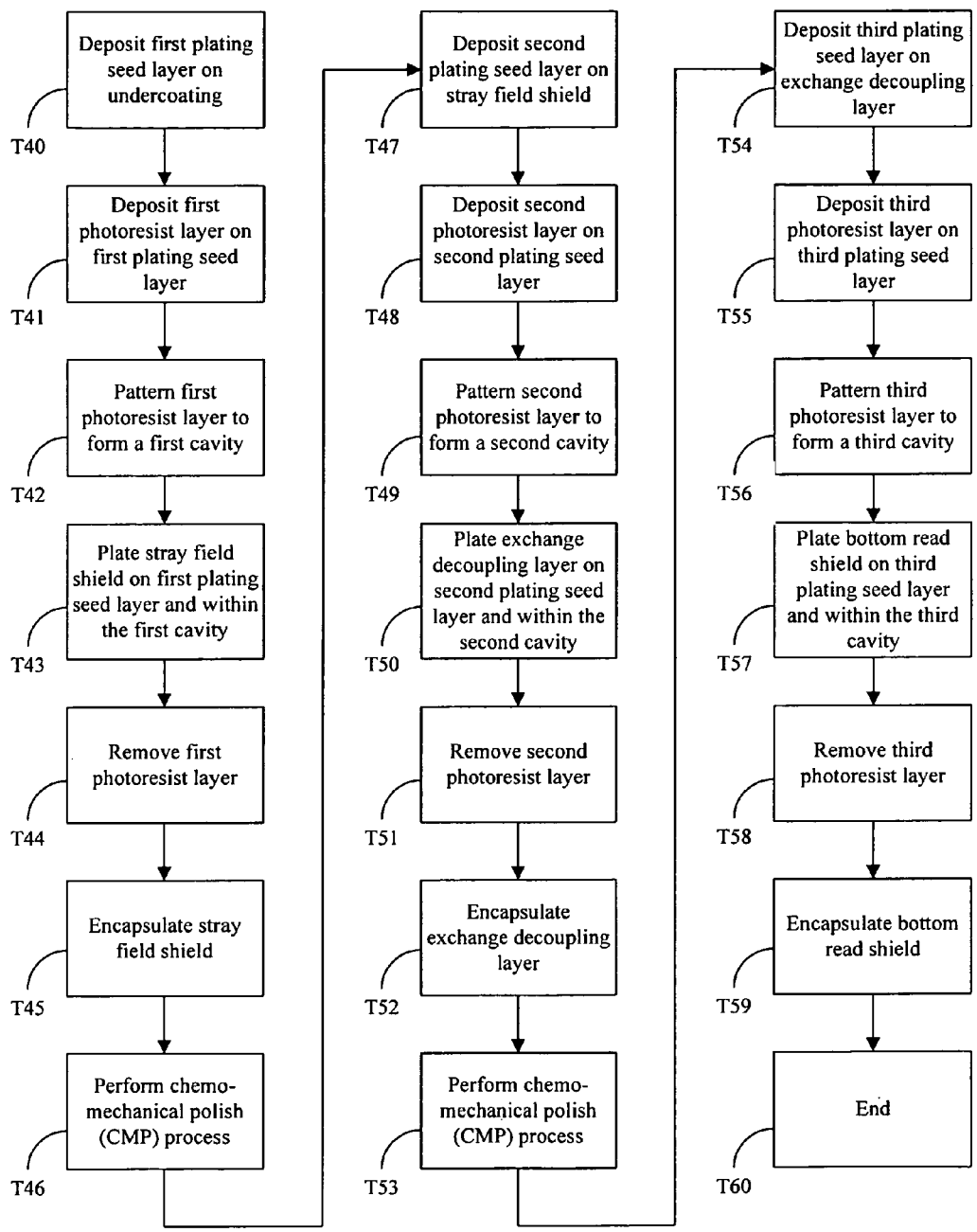
FIG. 15 illustrates a process of manufacturing a portion of a head in accordance with an embodiment of the present invention.

FIG. 15 illustrates a process of manufacturing a portion of the head 250 (refer to FIG. 13) using different masks for the stray field shield 253, the exchange decoupling layer 254, and the bottom read shield 255 in accordance with an embodiment of the present invention. Steps T40 through T59 in the process of FIG. 15 may replace steps T22 through T26 in the process of FIG. 14 when manufacturing the head 250 in accordance with various embodiments of the present invention.

In T40, a first plating seed layer (not shown) is deposited on the undercoating 252, and the process continues to T41. In T41, a first photoresist layer (not shown) is deposited on the first plating seed layer, and the process continues to T42. In T42, the first photoresist layer is patterned or developed to form a first cavity or window (not shown), and the process continues to T43. In T43, the stray field shield 253 is plated on the first plating seed layer and within the first cavity, and the process continues to T44. In T44, the first photoresist layer is removed, and the process continues to T45. In T45, the stray field shield 253 is encapsulated with, for example, aluminum-oxide, a ceramic, or the like, and the process continues to T46. In T46, a chemo-mechanical polish (CMP) process is performed to make a flat surface on the encapsulated stray field shield 253, and the process continues to T47.

In T47, a second plating seed layer (not shown) is deposited on the encapsulated stray field shield 253, and the process continues to T48. In T48, a second photoresist layer (not shown) is deposited on the second plating seed layer, and the process continues to T49. In T49, the second photoresist layer is patterned or developed to form a second cavity or window (not shown), and the process continues to T50. In T50, the exchange decoupling layer 254 is plated on the second plating seed layer and within the second cavity, and the process continues to T51. In T51, the second photoresist layer is removed, and the process continues to T52. In T52, the exchange decoupling layer 254 is encapsulated with, for example, aluminum-oxide, a ceramic, or the like, and the process continues to T53. In T53, a chemo-mechanical polish (CMP) process is performed to make a flat surface on the encapsulated exchange decoupling layer 254, and the process continues to T54.

In T54, a third plating seed layer (not shown) is deposited on the encapsulated exchange decoupling layer 254, and the process continues to T55. In T55, a third photoresist layer (not shown) is deposited on the third plating seed layer, and the process continues to T56. In T56, the third photoresist layer is patterned or developed to form a third cavity or window (not shown), and the process continues to T57. In T57, the bottom read shield 255 is plated on the third plating seed layer and within the third cavity, and the process continues to T58. In T58, the third photoresist layer is removed, and the process continues to T59. In T59, the bottom read shield 255 is encapsulated with, for example, aluminum-oxide, a ceramic, or the like, and then the process ends in T60.

By using different photoresist masks for the stray field shield 253, the exchange decoupling layer 254, and the bottom read shield 255, the stray field shield 253 may have a different height than a height of the bottom read shield 255. Also, by using different masks for the stray field shield 253, the exchange decoupling layer 254, and the bottom read shield 255, the stray field shield 253 may be recessed from the air bearing surface 270 of the head 250 while the bottom read shield 255 may extend to the air bearing surface 270 of the head 250.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A head, comprising:
    a read element having an air bearing surface for reading magnetic fields from a recording medium;
    a top read shield for shielding the read element from stray magnetic fields;
    a bottom read shield for shielding the read element from the stray magnetic fields, the bottom read shield having a thickness along the air bearing surface and a height perpendicular to the air bearing surface;
    a stray field shield for shielding the read element from the stray magnetic fields, the stray field shield having a thickness along the air bearing surface; and
    an exchange decoupling layer for providing exchange decoupling of the stray field shield and the bottom read shield;
    wherein the read element is located between the top read shield and the bottom read shield;
    wherein the bottom read shield is located between the stray field shield and the top read shield;
    wherein the exchange decoupling layer is located between the stray field shield and the bottom read shield; and
    wherein a ratio of the thickness of the stray field shield plus the thickness of the bottom read shield to the height of the bottom read shield is greater than 0.2.

2. The head of claim 1, wherein the read element comprises a magnetoresistive read element.

3. The head of claim 2, wherein the read element comprises at least one of an anisotropic magnetoresistive read element, a giant magnetoresistive read element, and a tunneling magnetoresistive read element.

4. The head of claim 1, wherein the top read shield comprises a magnetic material having a thickness between 1 and 3 microns along the air bearing surface.

5. The head of claim 1, wherein the bottom read shield comprises a magnetic material having a thickness between 1 and 3 microns along the air bearing surface.

6. The head of claim 1, wherein the bottom read shield comprises a ferromagnetic material.

7. The head of claim 1, wherein the stray field shield comprises a ferromagnetic material.

8. The head of claim 1, wherein the stray field shield comprises a NiFe invar like alloy where a Ni composition of the alloy is between 30 and 45 atomic percent.

9. The head of claim 1, wherein the bottom read shield comprises a first magnetic material and the stray field shield comprises a second magnetic material that is different from the first magnetic material.

10. The head of claim 9, wherein the second magnetic material has a lower coefficient of thermal expansion than the first magnetic material.

11. The head of claim 1, wherein a height of the stray field shield perpendicular to the air bearing surface is approximately the same as the height of the bottom read shield.

12. The head of claim 1, wherein a height of the stray field shield perpendicular to the air bearing surface is less than the height of the bottom read shield.

13. The head of claim 1, wherein a height of the top read shield perpendicular to the air bearing surface is approximately the same as the height of the bottom read shield.

14. The head of claim 1, wherein the stray field shield is thicker than the bottom read shield along the air bearing surface.

15. The head of claim 1, wherein the top read shield has approximately a same thickness as the bottom read shield along the air bearing surface.

16. The head of claim 1, wherein the stray field shield is wider than the bottom read shield along the air bearing surface, perpendicular to the thickness of the bottom read shield.

17. The head of claim 1, wherein the height of the bottom read shield is greater than a height of the read element perpendicular to the air bearing surface.

18. The head of claim 1, wherein the exchange decoupling layer comprises a non-magnetic material that is a thermal conductor for conducting heat out of the bottom read shield to limit protrusion of the bottom read shield.

19. The head of claim 1, wherein the stray field shield comprises a magnetic material and the exchange decoupling layer comprises a non-magnetic material that is more malleable than the magnetic material of the stray field shield.

20. The head of claim 1, wherein the exchange decoupling layer comprises a least one of copper, chromium, gold, silver, platinum, iridium, tantalum, titanium, and tungsten.

21. The head of claim 1, wherein the exchange decoupling layer has a thickness that is greater than 20 nm and less than or equal to 1 micron along the air bearing surface.

22. The head of claim 1, wherein the stray field shield is recessed from the air bearing surface of the head.

23. The head of claim 1, further comprising a write structure for writing data to the recording medium, wherein the top read shield is located between the read element and the write structure.

24. The head of claim 1, wherein the height of the bottom read shield is between 2 and 60 microns.

25. A disk drive, comprising:
a recording medium for storing data as magnetic fields; and
a head, comprising:
a read element having an air bearing surface for reading the magnetic fields from the recording medium;
a top read shield for shielding the read element from stray magnetic fields;
a bottom read shield for shielding the read element from the stray magnetic fields, the bottom read shield having a thickness along the air bearing surface and a height perpendicular to the air bearing surface;
a stray field shield for shielding the read element from the stray magnetic fields, the stray field shield having a thickness along the air bearing surface; and
an exchange decoupling layer for providing exchange decoupling of the stray field shield and the bottom read shield;
wherein the read element is located between the top read shield and the bottom read shield;
wherein the bottom read shield is located between the stray field shield and the top read shield;
wherein the exchange decoupling layer is located between the stray field shield and the bottom read shield; and
wherein a ratio of the thickness of the stray field shield plus the thickness of the bottom read shield to the height of the bottom read shield is greater than 0.2.

26. The disk drive of claim 25, wherein the bottom read shield comprises a first magnetic material and the stray field shield comprises a second magnetic material that has a lower coefficient of thermal expansion than the first magnetic material.

27. The disk drive of claim 25, wherein a height of the stray field shield perpendicular to the air bearing surface is less than the height of the bottom read shield.

28. The disk drive of claim 25, wherein the stray field shield is thicker than the bottom read shield along the air bearing surface.

29. The disk drive of claim 25, wherein the exchange decoupling layer comprises a non-magnetic material that is a thermal conductor for conducting heat out of the bottom read shield to limit protrusion of the bottom read shield.

30. The disk drive of claim 25, wherein the stray field shield comprises a magnetic material and the exchange decoupling layer comprises a non-magnetic material that is more malleable than the magnetic material of the stray field shield.

31. The disk drive of claim 25, wherein the exchange decoupling layer comprises at least one of copper, chromium, gold, silver, platinum, iridium, tantalum, titanium, and tungsten.

32. The disk drive of claim 25, wherein the stray field shield is recessed from the air bearing surface of the head.

33. The disk drive of claim 25, further comprising a write structure for writing data to the recording medium, wherein the top read shield is located between the read element and the write structure.

34. The disk drive of claim 25, wherein the height of the bottom read shield is between 2 and 60 microns.

35. The disk drive of claim 34, wherein the thickness of the bottom read shield is between 1 and 3 microns.

36. A magnetic head comprising:
a substrate;
an undercoating on the substrate, the undercoating comprising an insulating material;
a stray field shield on the undercoating, the stray field shield comprising a first magnetic material having a first thickness along an air bearing surface;
an exchange decoupling layer on the stray field shield;
a bottom read shield on the exchange decoupling layer, the bottom read shield comprising a second magnetic material having a second thickness along the air bearing surface and a height perpendicular to the air bearing surface;
an insulating layer on the bottom read shield;
a magnetic read element on the insulating layer for reading magnetic fields from a magnetic medium across the air bearing surface; and
a top read shield on the magnetic read element, the top read shield comprising a third magnetic material;
wherein the magnetic read element is located between the top read shield and the bottom read shield, the bottom read shield is located between the stray field shield and the top read shield, and the exchange decoupling layer is located between the stray field shield and the bottom read shield;
wherein the first, second and third magnetic materials shield the magnetic read element from stray magnetic fields and the non-magnetic material provides exchange decoupling of the stray field shield and the bottom read shield; and
wherein a ratio of the first thickness plus the second thickness to the height of the bottom read shield is less than 0.2.

37. The magnetic head of claim 36, wherein the height of the bottom read shield is between 2 and 60 microns.

38. The magnetic head of claim 37, wherein the thickness of the bottom read shield is between 1 and 3 microns.

39. The magnetic head of claim 38, wherein a height of the stray field shield perpendicular to the air bearing surface is between 2 and 60 microns.

40. The magnetic head of claim 36, wherein a height of the stray field shield perpendicular to the air bearing surface is less than the height of the bottom read shield.

41. The magnetic head of claim 36, wherein the non-magnetic material of the exchange decoupling layer has a thickness greater than 20 nm and less than 1 micron along the air bearing surface.

42. The magnetic head of claim 36, further comprising a magnetic write structure on the top read shield.

43. The magnetic head of claim 36, further comprising:
a first seed layer on the substrate; and
a first patterned cavity region defined on the first seed layer;
wherein the first magnetic material of the stray field shield is located on the first seed layer within the first patterned cavity region.

44. The magnetic head of claim 43, further comprising:
a second seed layer on the stray field shield; and
a second patterned cavity region defined on the second seed layer;

wherein the non-magnetic material of the exchange decoupling layer is located on the second seed layer within the second patterned cavity region.

45. The magnetic head of claim 44, further comprising:
a third seed layer on the exchange decoupling layer; and
a third patterned cavity region defined on the third seed layer;
wherein the second magnetic material of the bottom read shield is located on the third seed layer within the third patterned cavity region.

* * * * *